United States Patent
Singh et al.

(10) Patent No.: US 9,175,201 B2
(45) Date of Patent: *Nov. 3, 2015

(54) STABILIZED IODOCARBON COMPOSITIONS

(75) Inventors: Rajiv R. Singh, Morristown, NJ (US); Haridasan K. Nair, Morristown, NJ (US); Raymond H. Thomas, Morristown, NJ (US); Lawrence A. Ford, Morristown, NJ (US); David P. Wilson, Morristown, NJ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,071

(22) Filed: Mar. 13, 2012

(65) Prior Publication Data

US 2012/0187330 A1  Jul. 26, 2012

Related U.S. Application Data

(63) Continuation-in-part of application No. 11/795,779, filed as application No. PCT/US2005/046982 on Dec. 21, 2005, application No. 13/419,071, which is a continuation-in-part of application No. 12/467,061, filed on May 15, 2009, now Pat. No. 8,133,407, and a continuation-in-part of application No. 13/022,902, filed on Feb. 8, 2011, which is a continuation of application No. 11/937,267, filed on Nov. 8, 2007, now abandoned.

(60) Provisional application No. 60/638,003, filed on Dec. 21, 2004, provisional application No. 61/053,663, filed on May 15, 2008.

(51) Int. Cl.
*C09K 5/04* (2006.01)
*C10M 171/00* (2006.01)

(52) U.S. Cl.
CPC ............ *C09K 5/045* (2013.01); *C10M 171/008* (2013.01); *C09K 2205/122* (2013.01); *C09K 2205/126* (2013.01); *C10M 2205/026* (2013.01); *C10M 2205/08* (2013.01); *C10M 2207/023* (2013.01); *C10M 2207/026* (2013.01); *C10M 2207/042* (2013.01); *C10M 2209/1033* (2013.01); *C10M 2211/022* (2013.01); *C10M 2223/049* (2013.01); *C10N 2220/302* (2013.01)

(58) Field of Classification Search
CPC .......................... C09K 5/044; C09K 2205/122
USPC ........................................................ 252/68
See application file for complete search history.

(56) References Cited

U.S. PATENT DOCUMENTS

| | | |
|---|---|---|
| 2,834,748 A | 5/1958 | Bailey et al. |
| 2,846,458 A | 8/1958 | Haluska |
| 2,889,379 A | 6/1959 | Ruh et al. |
| 2,917,480 A | 12/1959 | Bailey et al. |
| 3,085,918 A | 4/1963 | Sherliker et al. |
| 4,465,786 A | 8/1984 | Zimmer et al. |
| 4,755,316 A | 7/1988 | Magid et al. |
| 4,798,818 A | 1/1989 | Baizer et al. |
| 5,380,449 A | 1/1995 | Thomas et al. |
| 5,716,549 A | 2/1998 | Nimitz et al. |
| 5,744,052 A | 4/1998 | Bivens |
| 5,932,775 A | 8/1999 | Lacroix et al. |
| 6,086,782 A | 7/2000 | Hsu et al. |
| 6,100,230 A | 8/2000 | Bement et al. |
| 6,183,661 B1 | 2/2001 | Makin et al. |
| 6,260,380 B1 | 7/2001 | Arman et al. |
| 6,516,837 B2 | 2/2003 | Thomas et al. |
| 6,589,355 B1 | 7/2003 | Thomas et al. |
| 6,743,765 B1 | 6/2004 | Dournel et al. |
| 6,858,571 B2 | 2/2005 | Pham et al. |
| 7,230,146 B2 | 6/2007 | Merkel et al. |
| 7,332,103 B2 | 2/2008 | Minor et al. |
| 2006/0019857 A1 | 1/2006 | Wilson et al. |
| 2006/0033072 A1 | 2/2006 | Wilson et al. |
| 2006/0043330 A1 | 3/2006 | Wilson et al. |
| 2008/0157022 A1 | 7/2008 | Singh et al. |
| 2011/0037017 A1 | 2/2011 | Leck |

FOREIGN PATENT DOCUMENTS

| | | | |
|---|---|---|---|
| DE | 4116274 A1 | | 11/1992 |
| EP | 0377122 A1 | | 7/1990 |
| EP | 0856571 A2 | | 8/1998 |
| EP | 0974571 A2 | | 1/2000 |
| GB | 1587907 A | | 4/1981 |
| JP | 53083148 A | | 7/1978 |
| JP | 04323294 A | | 11/1992 |
| JP | 08277389 A | | 10/1996 |
| JP | 9-059612 | * | 3/1997 |
| JP | 09059612 A | | 3/1997 |
| JP | 09111230 A | | 4/1997 |
| JP | 2000 309789 A | | 11/2000 |
| JP | 2005503854 A | | 2/2005 |
| JP | 2008504374 A | | 2/2008 |
| JP | 2008507524 A | | 3/2008 |
| WO | 97/15637 A1 | | 5/1997 |
| WO | 99/48993 A1 | | 9/1999 |
| WO | 00/39242 A1 | | 7/2000 |

(Continued)

OTHER PUBLICATIONS

Saunders and Frisch, "Polyurethanes Chemistry and Technology," vol. I and II, John Wiley and Sons, New York, NY 1962. US (too voluminous).

(Continued)

*Primary Examiner* — John Hardee
(74) *Attorney, Agent, or Firm* — Colleen D. Szuch

(57) ABSTRACT

Disclosed are compositions comprising at least one iodocarbon compound and preferably at least one stabilization agent. These compositions are generally useful as refrigerants for heating and cooling, as blowing agents, as aerosol propellants, as solvent composition, and as fire extinguishing and suppressing agents.

18 Claims, No Drawings

(56) References Cited

FOREIGN PATENT DOCUMENTS

| | | |
|---|---|---|
| WO | 02/20690 A1 | 3/2002 |
| WO | 02/40613 A1 | 5/2002 |
| WO | 2004037913 A2 | 5/2004 |
| WO | 2005/103187 A1 | 11/2005 |
| WO | 2005/103190 A1 | 11/2005 |
| WO | 2005/103191 A2 | 11/2005 |
| WO | 2006069362 A2 | 6/2006 |
| WO | 2008027511 A1 | 3/2008 |
| WO | 2008027512 A2 | 3/2008 |
| WO | 2008027513 A2 | 3/2008 |
| WO | 2008027514 A1 | 3/2008 |
| WO | 2008027516 A1 | 3/2008 |
| WO | 2008027517 A1 | 3/2008 |
| WO | 2008027518 A2 | 3/2008 |
| WO | 2008027519 A1 | 3/2008 |
| WO | 2008027595 A1 | 3/2008 |

OTHER PUBLICATIONS

Saunders and Frisch, "Polyurethanes Chemistry and Technology," High Polymers, Part II: Technology, vol. VIII, Rigid Foams, p. 193-223, John Wiley and Sons, New York, NY 1962. US.

A. Henne, et al., "The Degradation of Silver Trifluoroacetate to Trifluoroiodomethane," JACS, vol. 72, 3806 (1950) US.

S. Arctander, Consultant/Lecturer, "Perfume and Flavor Chemicals," Published by author 1969, Rutgers University, 3 pages, no page numbers. Section 1426: "Geraniol." US.

International Search Report, PCT/US05/046982, dated Dec. 20, 2006. WO.

* cited by examiner

STABILIZED IODOCARBON COMPOSITIONS

CROSS-REFERENCE TO RELATED APPLICATIONS

The present application is a continuation-in-part of pending each of U.S. application Ser. No. 11/795,779, filed on Mar. 10, 2008, as a U.S. national stage application of PCT Application No. PCT/US05/46982, filed on Dec. 21, 2005, which claims priority benefit of U.S. Provisional Application No. 60/638,003, filed on Dec. 21, 2004, all of which are incorporated herein by reference. The present application is also a continuation-in-part of U.S. application Ser. No. 12/467,061, filed on May 15, 2009, now U.S. Pat. No. 8,133,407, which claims priority benefit of U.S. Provisional Application No. 61/053,663, filed on May 15, 2008, all of which are incorporated herein by reference. The present application is also a continuation-in-part of pending U.S. application Ser. No. 13/022,902, filed on Feb. 8, 2011, which is a continuation of U.S. application Ser. No. 11/937,267, filed on Nov. 8, 2007, now abandoned.

BACKGROUND

Halogenated hydrocarbons have found widespread use in a variety of industrial applications, including as refrigerants, aerosol propellants, blowing agents, heat transfer media and gas dielectrics. Many of these applications have heretofore utilized compositions comprising major amounts of chlorofluorocarbons ("CFCs") and hydrochlorofluorocarbons ("HCFCs"). However, suspected environmental problems have become associated with the use of some of these halogenated hydrocarbons. For example, both CFCs and HCFCs tend to exhibit relatively high global warming potentials. Accordingly, it has become desirable in many applications to use compositions which are otherwise acceptable for the intended use but which at the same time have lower global warming potentials than CFCs and other disfavored halogenated compounds.

Applicants have recognized that certain compositions comprising iodinated compounds, and in particular, compositions comprising trifluoroiodomethane, may be used advantageously to replace various chlorinated compounds, many of which have high global warming potentials, in refrigeration (and other) applications to reduce potential environmental damage caused thereby. Applicants have further recognized, however, that iodinated compounds, such as trifluoroiodomethane, tend to be relatively unstable, and often significantly less stable than CFCs, HCFCs and hydrofluorocarbons (HFCs), especially under certain conventional refrigeration conditions.

To be useful as refrigerants and replacements for other CFC, HCFC and HFC fluids, suitable compositions comprising iodinated compounds must be stabilized. Applicants have recognized one possible way to produce suitable stable iodocompositions is to use stabilizing compounds therein.

A variety of stabilizers for use with HCFC and CFC compositions are known. HFCs, due to their exceptional stability, may or may not use stabilizers incorporated in their compositions as known in the art. For example, U.S. Pat. No. 5,380,449 discloses compositions comprising dichlorotrifluoroethane and stabilizing amounts of at least one phenol and at least one aromatic or fluorinated alkyl epoxide. However, because iodo-compounds tend to be significantly less stable that CFCs and HCFCs, it cannot be predicted from teachings of stabilizers for CFCs and HCFCs (e.g. the '449 disclosure) whether the same or similar compounds are capable of stabilizing iodo-compounds to a sufficient degree for use as CFC/HCFC replacements. That is, as will be recognized by those of skill in the art, C—Cl and C—F bonds tend to be at least about 1.5-2 times stronger than C—I bonds. Accordingly, it is neither inherent nor necessarily reasonable to expect that a compound that stabilizes an HCFC or CFC will be suitable for an iodo-compound which requires about twice the amount of added stability to be useful in refrigerant applications.

Applicants have thus recognized the need to produce compositions comprising iodo-compounds, such as trifluoroiodomethane, that are sufficiently stable for a variety of uses including as replacements for CFC, HCFC and HFC refrigerants.

It has been proposed to utilize certain iodocarbon compounds in refrigeration applications as replacements for certain of the CFCs and HCFCs that have heretofore been used. For example, Japanese Kokai 09-059612 (Application No. 07-220964) discloses refrigerant compositions comprising trifluoroiodomethane and one or more phenolic compounds. This patent document indicates that the phenolic compositions act to stabilize the trifluoroiodomethane against degradation.

While the compositions containing phenolic compounds as stabilizers for trifluoroiodomethane may enjoy a certain degree of success, in certain applications it may be desirable to not use phenolic compounds or to use such compounds in a lower concentration. For example, phenols are generally acidic due to the dissociability of the hydroxyl group and are relatively reactive. These characteristics may be undesirable in certain applications and/or in certain situations.

SUMMARY OF THE INVENTION

The present invention provides a variety of compositions comprising iodocarbon compounds, such as trifluoroiodomethane ($CF_3I$), that are surprisingly stable and can be used advantageously in a variety of applications, including as refrigerants in various cooling systems. In particular, applicants have discovered unexpectedly that iodocarbon compounds in general, and C1-C5 iodocarbons, and even more preferably C1-C2 iodocarbons, particularly (such as the preferred C1 iodocarbon trifluoroiodomethane) can be combined with one or more stabilizer compounds selected from a specific set of compounds to produce an exceptionally well stabilized iodocarbon-containing composition, preferably a trifluoroiodomethane-containing composition suitable for commercial, industrial or personal use, and particularly as heat transfer fluids for use in refrigeration systems, air conditioning systems (including automotive air conditioning systems) and the like. In addition, not only are the present compositions sufficiently stable for a variety of uses, but also, they tend to exhibit a unique combination of non-flammability and low combined ozone-depletion and global warming properties, making them particularly useful candidates as CFC, HCFC, and HFC refrigerant replacements.

As used herein, the term "iodocarbon" refers to any compound containing at least one carbon-iodine bond, and is intended to cover iodofluorocarbons (compounds which have at least one carbon-iodine bond and at least one carbon-fluorine bond, but no other bonds except carbon-carbon bonds) and hydroiodofluorocarbons (compounds which have at least one carbon-iodine bond, at least one carbon-fluorine bond, at least on carbon-hydrogen bond, but no other bonds except carbon-carbon bonds).

The present invention is therefore directed, in one embodiment, to compositions comprising at least one iodocarbon compound, preferably a C1-C5 iodocarbon and even more preferably a C1 iodocarbon, and at least one stabilizing compound. It is contemplated that in certain cases the composition may include any one or more of a class of stabilizers based on free-radical scavenging functionality, but in many preferred embodiments the stabilizer comprises, and preferably in at least major proportion, diene-based compound(s), certain phenol compounds, certain epoxides, certain phosphites, and certain phosphates.

In certain preferred embodiments, the diene-based compounds are isoprene-based compound(s). As the term is used herein, "diene-based compound" refers to both substituted and unsubstituted C3-C5 compounds with two or more double bonds in the molecular structure and to compounds that can be formed by reaction(s) involving such C3-C5 compounds, provided that at least one double-bonds is present in such reaction product compound. In preferred embodiments, the diene-based compound of the present invention comprises substituted and unsubstituted C3-C20 compounds with two or more double bonds in the molecular structure. As the term is used herein, "isoprene-based compound" refers to isroprene, compounds having an isoprene moiety, and to compounds capable of being formed by reaction(s) involving isoprene. For example, as used herein determined diene-based compounds include myrcene and farsenol, each of which has three carbon-carbon double bonds. Thus, the term "diene-based" is not limited to compounds having only two double bonds, but includes compounds having fewer or more than two carbon-carbon double bonds. In the case of diene-based compounds which are formed by a combination of C3-C5 dienes, the molecules which are combined can be the same or different.

Applicants have come to appreciate that, under certain conditions of use, iodocarbon compounds tend to be generally less stable than compounds, which have C—Cl and C—F bonds in place of the C—I bond, and particularly when in the presence of lubricant compounds and even more particularly when in the presence of lubricant compounds under temperature conditions that are experienced by refrigerants in vapor compression cycle operation. Applicants have thus recognized the desirability of providing compositions comprising iodocarbon compounds, such as trifluoroiodomethane, that are sufficiently stable for a variety of uses, including in heat transfer applications, including as refrigerants and even more preferably as replacements for CFC and HCFC refrigerants. Such compositions provide the potential to reduce environmental damage that would be caused if CFC and HCFC-based compositions were used instead of the compositions of the present invention. Applicants have further recognized, however, that iodinated compounds generally tend to be relatively unstable, and often significantly less stable than CFCs and HCFCs under certain conditions of use, such as under conditions existing in conventional refrigeration systems. For example, while performing standard, recommended ASHRAE and SAE testing on various refrigerants, the present inventors discovered that compounds comprising iodofluorocarbon produced the brown/black color of iodine, which is believed to have been formed from the degradation of the iodofluorocarbon during the testing conditions.

The present inventors have discovered unexpectedly that iodocarbon compounds, preferably C1-C2 iodocarbons, more preferably C1 iodocarbons, and even more preferably trifluoroiodomethane, can be combined with at least one stabilizing compound, preferably a compound having free radical scavenging functionality, and even more preferably at least one compound selected from the group consisting of: (1) diene-based compounds, preferably diene-based compounds have at least two carbon-carbon double bonds and at least four carbon atoms; (2) epoxy compounds, including preferably epoxy compounds selected from substituted or unsubstituted compounds according to Formulas (E1) and (E2) below:

(E1)

(E2)

where $R^1$ is an aliphatic radical having at least 3 carbon atoms, preferably at least 4 carbon atoms, and more preferably in certain embodiments $R^1$ is an unsaturated aliphatic radical having from 4 to 6 carbon atoms, with $R^1$ being a 4 carbon unsaturated aliphatic radical in certain highly preferred embodiments;

$R^2$ is an aliphatic radical having 4 or 5 carbon atoms or a polycyclic aromatic radical, preferably a naphthyl radical, and combinations of these;

(3) phosphites according to formula P1 below

where each R is independently a phenyl radical or a carboxylate radical having at least 6 but less than 15 carbon atoms;

(4) unhindered or mildly hindered phenols, as that term is defined hereinafter, and combinations of any two or more of these.

As used herein, the term mildly hindered phenol means a substituted phenol in which there are aliphatic substituents at the 2 and 6 positions on the phenol ring and wherein the total number of substituent carbon atoms at these positions is greater than four but less than eight. IN preferred embodiments, the total number of substituent carbon atoms at positions 2 and 6 is five or six, and even more preferably five. As used herein, the term unhindered phenol means a phenol in which there are a total of not greater than a total of two carbon atoms in the combination of any substituents present at either the 2 or 6 positions on the phenol ring.

In certain highly preferred embodiments, the stabilizing compound used in accordance with the various aspects of the present invention comprises, and preferably comprises in major proportion, and more preferably in certain embodiments consists essentially of at least one compound selected from the group consisting of: (1) diene-based compounds, preferably diene-based compounds have at least two carbon-carbon double bonds and at least four carbon atoms; (2) epoxy compounds, including preferably epoxy compounds selected from substituted or unsubstituted compounds according to Formulas (E1) and (E2) below:

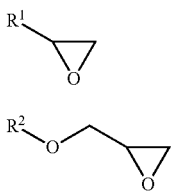

(E1)

(E2)

where

R¹ is an aliphatic radical having at least 3 carbon atoms, preferably at least 4 carbon atoms, and more preferably in certain embodiments R¹ is an unsaturated aliphatic radical having from 4 to 6 carbon atoms, with R¹ being a 4 carbon unsaturated aliphatic radical in certain highly preferred embodiments;

R² is an aliphatic radical having 4 or 5 carbon atoms or a polycyclic aromatic radical, preferably a naphthyl radical, and combinations of these;

(3) phosphites according to formula P1 below:

where each R is independently a phenyl radical or a carboxylate radical having at least 6 but less than 15 carbon atoms; and combinations of any two or more of these.

In addition, not only are the present compositions sufficiently stable for a variety of uses, but they tend also to exhibit a unique combination of non-flammability and low ozone-depletion properties, making them particularly useful as heat transfer fluids, particularly as replacement candidates for currently used refrigerants, such as CFC and HCFC refrigerant replacements. Furthermore, applicants have discovered that many advantages in accordance with the present invention can be achieved for compositions comprising, in addition to the iodocarbon, and preferably also the stabilizing agent, one or more other compounds, including especially HFCs, preferably C1-C4 HFCs, and halogenated olefins, preferably C2-C5 halogenated olefins.

Applicants have further recognized that the preferred compositions of the present invention are stable and suitable for use in many systems, apparatus and methods. For example, one aspect of the present invention provides systems, apparatus and methods that comprise the compositions of the present invention being included as a heating or cooling fluid (based on latent heat transfer and/or sensible heat transfer), such as in refrigeration applications, including particularly automotive air conditioning applications. Other systems, apparatus and methods are also within the scope of the present invention, as explained more fully hereinafter.

In yet another aspect, the present invention provides methods, systems and apparatus for stabilizing a composition comprising at least one iodocarbon compound by use of a stabilizing agent which preferably, comprises one or more of the preferred stabilizing compounds mentioned herein, preferably in many preferred embodiments comprising a diene-based compound, in accordance with the present invention.

DESCRIPTION OF PREFERRED EMBODIMENTS

I. The Compositions—Generally

The preferred compositions comprise at least one iodocarbon, preferably a C1 iodofluorocarbon (such as trifluoroiodomethane ($CF_3I$)), and preferably also at least one stabilizing agent, preferably one or more of the preferred stabilizing compounds mentioned herein, including diene-based compounds, preferably in an amount effective under conditions of use to stabilize the iodocarbon against degradation. Certain preferred compositions of the present invention comprise iodocarbon and at least one saturated HFC and/or at least one haloalkene, preferably one or more C1-C4 HFCs and/or one or more, C2-C5 haloalkenes.

When haloalkenes are present, the haloalkene preferably comprises C2-C4 haloalkene, and even more preferably C2-C4 haloalkene with at least two, and preferably at least three fluorine substituents. Highly preferred among such haloalkenes, especially for use in connection with heat transfer applications such as automotive air conditioning, are tetrafluoropropenes, particularly 2,3,3,3-tetrafluoropropene (HFO-1234yf). In certain of such preferred embodiments, the composition comprises from about 5% to about 50% by weight of iodocarbon, more preferably from about 20% to about 40% by weight of iodocarbon, and even more preferably from about 25% to about 35% of iodocarbon, and from about 50% to about 95% by weight of HFCs, preferably C1-C4 HFCs, and/or halogenated olefins, preferably C2-C5 halogenated olefins, and even more preferably C2-C4 haloalkene, more preferably from about 60% to about 80% by weight of HFCs, preferably C1-C4 HFCs, and/or halogenated olefins, preferably C2-C5 halogenated olefins, and even more preferably C2-C4 haloalkene, and even more preferably from about 65% to about 75% of HFCs, preferably C1-C4 HFCs, and/or halogenated olefins, preferably C2-C5 halogenated olefins, and even more preferably haloalkene, based on the total weight of the iodocarbon and the haloalkene.

Certain preferred compositions of the present invention comprise iodocarbon and at least one C1-C4 HFC, preferably C1-C3 HFC, and even more preferably C1-C2 HFC. In certain of such preferred embodiments, the composition comprises from about 50% to about 95% by weight of iodocarbon, more preferably form about 65% to about 85% of iodocarbon, and from about 5% to about 50% by weight of HFC, and even more preferably from about 15% to about 35% of HFC, based on the total weight of the iodocarbon and the HFC.

In preferred embodiments, the present compositions have a Global Warming Potential (GWP) of not greater than about 1000, more preferably not greater than about 500, and even more preferably not greater than about 150, and in certain cases of not greater than about 100. In certain embodiments, the GWP of the present compositions is not greater than about 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference.

The compositions preferably also having an Ozone Depleting Potential (ODP) of not greater than about 0.05, more preferably not greater than about 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

A. The Iodocarbon

In view of the teachings contained herein, it is contemplated that the iodocarbon compound in accordance with the present invention may comprise one or more of a wide variety of such compounds. For example, it is contemplated that in certain preferred embodiments the iodocarbon compound is a C1-C6 iodocarbon, and even more preferably a C1-C3 iodofluorocarbon. The iodocarbon can be comprised of carbon, hydrogen, fluorine and iodine.

In certain preferred compositions of the present invention, the iodocarbon comprises a C1-C3 iodocarbon, more preferably a C1 iodocarbon, and even more preferably a C1 iodofluorocarbon. In certain highly preferred embodiments, the at least one iodocarbon compound comprises, and preferably comprises in major proportion on the basis of the total iodocarbon compounds, trifluoroiodomethane ($CF_3I$). Thus, in certain highly preferred embodiments, the present compositions comprise at least one C1 compound containing only carbon-fluorine bonds and carbon-iodine bonds, with C1 compounds containing at least two carbon-fluorine bonds and at least one carbon-iodine bond being even more preferred.

Trifluoroiodomethane is readily available from a variety of commercial sources, including Matheson TriGas, Inc. In addition, trifluoroiodomethane prepared via any of a variety of conventional methods may be used. An example of one such conventional method of preparing trifluoroiodomethane is disclosed in JACS 72, 3806 (1950), "The Degradation of Silver Trifluoroacetate to Trifluoroiodomethane" by Albert L. Henne and William G. Finnegan, which is incorporated herein by reference.

In general, the iodocarbon compounds may be present in the compositions in widely ranging amounts, depending on numerous factors, including for example the particular intended conditions of use of the compound. In certain preferred embodiments, iodocarbon compound(s) are present in the present composition in amounts, based on weight, of from about 5% to less than about 100%, more preferably from about 20% to less than about 100%. In certain preferred embodiments, particularly those in which the composition contains HFC(s), the iodocarbon compound(s) are present in the present composition in amounts, based on weight, of from about 5% to about 35%, more preferably from about 45% to about 95%, and even more preferably from about 65% to about 95%. In certain, preferred embodiments, particularly those in which the composition contains halogenated alkene(s), the iodocarbon compound(s) are present in the present composition in amounts, based on weight, of from about 15% to about 50%, more preferably from about 20% to about 40%, and even more preferably from about 25% to about 35%.

With respect to the relative weight of the iodocarbon compound(s) and the stabilizing agent, in certain embodiments the iodocarbon is present in an amount of from about 90% to about 99.999% by weight, more preferably from about 95 wt. % to about 99.99 wt. %, and even more preferably from about 96 wt. % to about 99.7 wt. %, based on the total weight of iodocarbon and stabilizing agent, preferably diene-based compounds in the composition.

B. The Stabilizer(s)

In certain preferred embodiments, the stabilizer compounds are present in the composition in amounts of from about 0.001% to about 15% by weight, more preferably from about 0.01 wt. % to about 10 wt. %, and even more preferably from about 0.3 wt. % to about 5 wt. %, and even more preferably from about 1 to about 2 wt. % based on the total weight of the composition, preferably composition that is comprised of the iodocarbon, and more preferably the refrigerant composition that is comprised of the iodocarbon. In some cases, the stabilizer compounds are present in the composition in amounts of from about 0.001% to about 15% by weight, more preferably from about 0.01 wt. % to about 10 wt. %, and even more preferably from about 0.3 wt. % to about 5 wt. %, and even more preferably from about 1 to about 2 wt. % based on the total weight of a lubricant and stabilizer. In certain preferred embodiments, the stabilizer compound is present in amounts of from about 0.5 wt. % to about 2 wt. %, based on the total weight of composition, preferably the composition that is comprised of the iodocarbon.

1—Diene-Based Compound(s)

It is contemplated that any one or more of the available diene-based compounds are adaptable for use in accordance with the present invention and that those skilled in the art will be able, in view of the teachings contained herein, to select the number and type of such compound(s) appropriate for any particular application without undue experimentation. The type and nature of the diene-based compound(s) to be used may depend, to at least some degree, upon the particular iodocarbon compound(s) being used in the composition, the expected conditions of use of the compositions, and related factors.

It is generally contemplated that the amount of the diene-based stabilizer used in the compositions of the present invention can vary widely, depending upon factors such as the type of iodocarbon in the composition, the expected conditions of use of the composition, among other factors. In general, it is preferred to use diene-based stabilizer in an effective amount relative to the iodocarbon being used. As used herein, the term "effective amount" refers to an amount of diene-based compound(s) which, when added to a composition comprising the relevant iodocarbon compound, such as trifluoroiodomethane, results in a stabilized composition wherein the iodocarbon degrades more slowly and/or to lesser degree relative to the same composition, under the same, or similar, conditions, but in the absence of the diene-based compounds. In the particular example of trifluoroiodomethane, one of the important breakdown products is trifluoromethane, which is formed by the substitution of hydrogen for iodine in the $CF_3I$ molecule. Similarly, hydrogen can be substituted for iodine in other iodocarbons, thereby forming compounds that can have relatively high GWP values, for example greater than 150. These breakdown products have the effect of raising the GWP of the refrigerant blends that use iodocarbons. The goal of having a low global warming potential is therefore defeated. An effective amount of stabilizer preferably will reduce the amount of decomposition of the iodocarbon such that the GWP of the refrigerant composition is below 1000, and even more preferably less than 150. Even without the consideration of GWP values, breakdown of a component of a refrigerant composition is undesirable. Thus it is preferred that the level of the breakdown product described above be less than 2.0 wt %, more preferably less than about 1.0 wt. %, and even more preferably less than about 0.5 wt % of the total refrigerant composition. In certain preferred embodiments, the amount of the diene-based compound(s) is sufficient to result in a stabilized composition wherein at least one of the iodocarbon compound(s) therein degrades more slowly and/or to a lesser degree relative to the same composition but in the absence of the diene-base compound, when tested according to SAE J1662 (issued June 1993) and/or ASHRAE 97-1983R (issued 1997) standard tests. For example, in certain preferred embodiments, the amount of breakdown product, that is product formed by the substitution of hydrogen for iodine in the iodocarbon, is less than about 0.9 wt. %, and even more preferably less than about 0.7 wt % after the composition is maintained at about 300° F. for about two weeks.

The diene-based compounds of the present invention may be cyclic or acyclic, with acyclic compounds being generally preferred in many embodiments. The acyclic diene-based compounds for use in the present invention are preferably C5-C30 diene-based compounds, more preferably C5-C20 diene-based compounds and even more preferably C5-C15 diene based compounds. For cyclic diene-based compounds, the compound may be aromatic or non-aromatic, with non-aromatic diene-based cyclic compounds being preferred in certain embodiments.

In preferred embodiments the diene-based compounds are selected from the group consisting of allyl ethers, propadiene, butadiene, isoprene-based compounds (including terpenes (such as myrcene, farnesene, and limonene), and terpene derivatives (such as farnesol, and geraniol)) and combinations of any two or more of these. As used herein, each of the compounds identified in the immediately preceding list is intended to include both substituted and unsubstituted forms of the identified compounds. In certain preferred embodiments, the diene-based compounds comprise in major proportion, and even more preferably consist essentially of, propadiene.

In certain other preferred embodiments, the diene-based compounds comprise in major proportion, and even more preferably consist essentially of, terpenes, terpene derivatives or combinations of these. As used herein, the term "terpene" means a compound, which is comprised of at least ten carbon atoms and contains at least one, and preferably at least two isoprene moieties. In many preferred embodiments, the terpene compound of the present invention is formed from the reaction of at least two isoprene C5 units (CH2=C(CH3)-CH=CH2) (each unit being substituted or unsubstituted), and thus many of the terpene compounds of the present invention preferably have as at least 10 carbon atoms and include at least one isoprene moiety. As used herein, the term "isoprene moiety" refers to any portion of a molecule, which includes a radical, which can be formed from substituted or unsubstituted isoprene. In certain preferred embodiments, unsubstituted terpenes are preferred.

In many preferred embodiments, the terpene compound of the present invention comprises at least one head-to-tail condensation product of modified or unmodified isoprene molecules. It is contemplated that any one or more terpene compounds are adaptable for use in accordance with the present invention and that those skilled in the art will be able, in view of the teachings contained herein, to select the number and type of terpene compound(s) for any particular application without undue experimentation. The preferred terpenes of the present invention are hydrocarbons having molecular formula $(C_5H_8)_n$ in a cyclic or acyclic, saturated or unsaturated, substituted or unsubstituted structure, with n preferably being from 2 to about 6, and even more preferably 2 to 4. Terpenes according to the present invention having the formula $C_{10}H_{16}$ (including substituted forms) are sometimes referred to herein as monoterpenes, while terpenes having the formula $C_{15}H_{24}$ (including substituted forms) are sometimes referred to herein as sesquiterpenes. Terpenes according to the present invention having the formula $C_{20}H_{32}$ (including substituted forms) are sometimes referred to herein as diterpenes, while terpenes having the formula $C_{30}H_{24}$ (including substituted forms) are sometimes referred to as triterpenes, and so on. Terpenes containing 30 or more carbons are usually formed by the fusion of two terpene precursors in a regular pattern. While it is contemplated that all such terpenes are adaptable for use in accordance with the present invention, the use of monoterpenes is generally preferred.

In certain preferred embodiments, the terpene compound(s) of present compositions comprise, preferably in major proportion, and even more preferably consist essentially of, one or more acyclic terpene compounds. Among the acyclic terpenes, it is contemplated that such compounds may be within the class of compounds identified as head-to-tail linked isoprenoids or within the class of compounds that are not joined in that manner. Acyclic terpenes which are preferred for use in accordance with certain aspects of the present invention include myrcene (2-methyl-6-methyleneocta-1,7-diene), allo-cimene, beta-ocimene.

In certain embodiments, the terpene compounds of the present invention may comprise cyclic terpene compounds. Among the cyclic terpenes, mono-, bi-, tri-, or tetracyclic compounds having varying degrees of unsaturation are contemplated for use in accordance with the present invention.

Examples of terpene compounds adaptable for use in connection with the various aspects of the present invention include terebene, myrcene, limonene, retinal, pinene, menthol, geraniol, farnesol, phytol, Vitamin $A_1$, terpinene, delta-3 carene, terpinolene, phellandrene, fenchene, and the like, as well as blends thereof, including all their isomers.

In certain preferred embodiments, the terpene compounds of the present composition comprise one or more sequiterpenes, preferably farnesol and/or farnesene. The term "farnesol" is the compound 3,7,11-trimethyl-2,6,10-dodecatrien-1-ol, including any and all stereoisomers thereof. Farnesol is a natural organic compound which is a sesquiterpene alcohol found as a colorless liquid and is insoluble in water, but miscible with oils. It has the chemical structure:

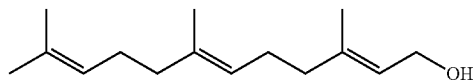 [SMILES: CC(C)=CCC/C(C)=C/CC/C(C)=C/CO]

The term "farnesene" includes α-farnesene (i.e., 3,7,11-trimethyldocecadodeca-1,3,6,19-tetraene) and β-farnesene (i.e., 7,11-dimethyl-3-methylene-1,6,10-dodecatriene), including any and all stereoisomers thereof.

Examples of terpene derivatives in accordance with the present invention include oxygen-containing derivatives of terpenes such as alcohols, aldehydes or ketones containing hydroxyl groups or carbonyl groups, as well as hydrogenated derivates. Oxygen-containing derivatives of terpenes are sometimes referred to herein as terpenoids. In certain embodiments, the diene-based compounds of the present invention comprise the terpenoid Carnosic acid. Carnosic acid is a phenolic diterpene that corresponds to the empirical formula C2O28O4. It occurs naturally in plants of the Libiatae family. For instance, carnosic acid is a constituent of the species Salvia officinalis (sage) and Rosmarinus officinalis (rosemary) where it is mainly found in the leaves. Carnosic acid is also found in thyme and marjoram (see Linde in Salvia officinalis [Helv. Chim Acta 47, 1234 (1962)] and Wenkert et al. in Rosmarinus officinalis [J. Org. Chem. 30, 2931 (1965)], and in various other species of sage, (see Salvia canariensis [Savona and Bruno, J. Nat. Prod. 46, 594 (1983)] and Salvia willeana [de la Torre et al., Phytochemistry 29, 668 (1990)]). It is also present in Salvia triloba and Salvia sclarea. Other potential terpenoids are illustrated below:

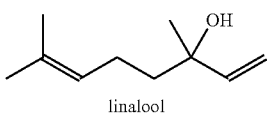
linalool

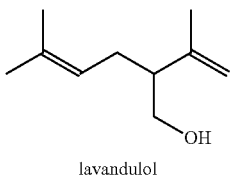
lavandulol

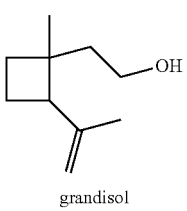
grandisol

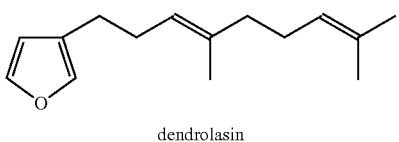
dendrolasin

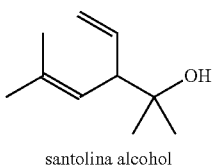
santolina alcohol

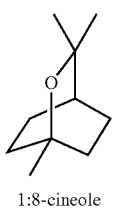
1:8-cineole

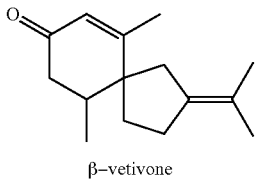
β–vetivone

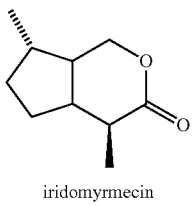
iridomyrmecin

-continued

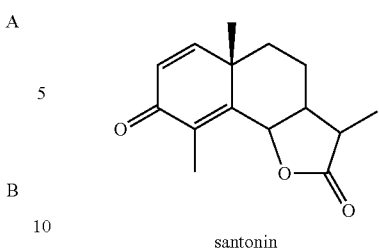
santonin

According to certain preferred embodiments, the present compositions comprise a combination of at least one diene-based compound (such as isoprene, propadiene and myrcene) and one additional stabilizing compound chosen from epoxides, such as aromatic epoxides and fluorinated alkyl epoxides, hindered phenols such as DL-alpha-tocopherol and 2-tert-butyl-4,6-dimethylphenol, phosphites such as diphenyl phosphate (e.g., Doverphos 213) and triphenyl phosphite alone and in mixtures such as Doverphos 9EII, esters of phosphorous acid such as Doverphos 613 and mixtures of the above mentioned materials.

Any suitable relative amount of the at least one diene-based compound and supplemental optional stabilizer compound(s) may be used. For example, in certain preferred embodiments the weight ratio of the diene-based compound(s) to other stabilizer compound(s) is in the range of from about 1:99 to about 100:0. In more preferred embodiments, the weight ratio of diene-based compound(s) to the optional stabilizers is from about 10:1 to about 1:1, more preferably from about 2:1 to about 1:1, and even more preferably about 1:1.

2—The Phenols

It is contemplated that any of a variety of phenol compounds are suitable for use as stabilizer in the present compositions. While applicants do not wish to be bound by or to any theory of operation, it is believed that the present phenols act as radical scavengers in the present compositions and thereby tend to increase the stability of such compositions. As used herein the term "phenol compound" refers generally to any substituted or unsubstituted phenol. Examples of suitable phenol compounds include 4,4'-methylenebis(2,6-di-tert-butylphenol); 4,4'-bis(2,6-di-tert-butylphenol); 2,2- or 4,4-biphenyldiols including 4,4'-bis(2-methyl-6-tert-butylphenol); derivatives of 2,2- or 4,4-biphenyldiols; 2,2'-methylenebis(4-ethyl-6-tertbutylpheol); 2,2'-methylenebis(4-methyl-6-tert-butylphenol); 4,4,-butylidenebis(3-methyl-6-tert-butylphenol); 4,4,-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol; 2,4-dimethyl-6-tert-butylphenol; 2,6-di-tert-.alpha.-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; and bis(3,5-di-tert-butyl-4-hydroxybenzyl)sulfide; and the like. Other suitable phenols include tocopherol, hydroquinone; t-butyl hydroquinone; and other derivatives of hydroquinone; and the like. Certain preferred phenols include tocopherol, BHT, hydroquinone and the like. Certain particularly preferred phenols include tocopherol and the like. Most phenols are commercially available such as the Irganox compounds from Ciba. A single phenol compound and/or mixtures of two or more phenols may be used in the present compositions.

3—The Epoxides

It is also contemplated that any of a variety of epoxides are suitable for use in the compositions of the present invention. Among the epoxides, aromatic epoxides and fluorinated alkyl epoxides are preferred additional stabilizers in certain embodiments. While applicants do not wish to be bound by or to any theory of operation, it is believed that the epoxides of the present invention act as acid scavengers in the $CF_3I$ compositions and thereby tend to increase the stability of such compositions. Examples of suitable aromatic epoxides include those defined by the formula I below:

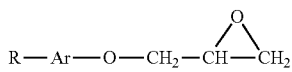

(I)

wherein: R is hydrogen, alkyl, fluoroalkyl, aryl, fluoroaryl, or

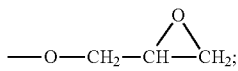

and
Ar is a substituted or unsubstituted phenylene or napthylene moiety. Certain preferred aromatic epoxides of Formula I include: butylphenylglycidyl ether; pentylphenylglycidyl ether; hexylphenylglycidyl ether; heptylphenylglycidyl ether; octylphenylglycidyl ether; nonylphenylglycidyl ether; decylphenylglycidyl ether; glycidyl methyl phenyl ether; 1,4-diglycidyl phenyl diether and derivatives thereof; 1,4-diglycidyl naphthyl diether and derivatives thereof; and 2,2'[[[5-heptadecafluorooctyl]1,3-phenylene]bis[[2,2,2trifluoromethyl]ethylidene]oxymethylene]bisoxirane; and the like. Other preferred aromatic epoxides include naphthyl glycidyl ether, 4-methoxyphenyl glycidyl ether, and derivatives of naphthyl glycidyl ether; and the like. Certain more preferred aromatic epoxides include butylphenyl glycidyl ether, and the like. A single aromatic epoxide and/or mixtures of two or more aromatic epoxides may be used in the present compositions.

Any of a variety of alkyl and/or alkenyl epoxides is suitable for use in the present compositions. Examples of suitable alkyl and alkenyl epoxides include those of Formula II:

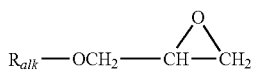

(II)

wherein $R_{alk}$ is a substituted or unsubstituted alkyl or alkenyl group. Preferably, $R_{alk}$ is a substituted or unsubstituted alkyl or alkenyl group having from about 1 to about 10 carbon atoms, more preferably from about 1 to about 6 carbon atoms. Certain preferred alkyl epoxides of Formula II include n-butyl glycidyl ether, isobutyl glycidyl ether, hexanediol diglycidyl ether, and the like, as well as, fluorinated and perfluorinated alkyl epoxides. More preferred alkyl epoxides include hexanediol diglycidyl ether and 1,2-epoxyhexane. Certain preferred alkenyl epoxides of Formula II include allyl glycidyl ether, fluorinated and perfluorinated alkenyl epoxides, and the like. More preferred alkenyl epoxides include allyl glycidyl ether and the like.

D. Other Components

The present compositions may optionally incorporate other components depending upon the particular contemplated use and the specific iodocarbon and stabilization compounds being used.

1-Co-Refrigerants, Co-Blowing Agents, Etc.

According to certain embodiments, as explained more fully hereinafter, the compositions of the present invention may further comprise one or more components in addition to the iodocarbon and the stabilizing agent when present, depending upon the expected use of the composition. For example, the present compositions are generally adaptable for use in connection with the following applications, and various co-components may be associated with the compositions in connection with these and other applications: heat transfer (including refrigeration, chiller applications, closed Rankine cycle operations (CRC)); organic Rankine cycle operations (ORC); foam and/or foam forming operations (including as or part of a premix and/or blowing agent and/or foam (including thermosetting foams (such as polyurethane, polyisocyanurate, and phenolic), thermoplastic foams (such as polystyrene and polyolefin), integral skin foams, one or two component pressurized froth foam, and the like; solvent (including solvent cleaning and extraction); aerosol; oligomer and/or polymer production (such as monomer for polymerization reactions); propellants; fire extinguishing aids; surfactants; flushing applications; metered dose inhalers (MDI); lubricating agents; flame suppressants; therapeutic compositions; pesticide compositions; herbicide compositions; solvent applications (including cleaning, extraction and deposition applications) and the like.

While it is contemplated that many co-components may be use with advantage in the present compositions, it is preferred in several embodiments that the present compositions have as a co-component one or more of the following components:
$CO_2$:
Hydrocarbons (substituted and un-substituted, particularly C2-C6 hydrocarbons);
Alcohols (substituted and un-substituted, particularly C2-C6 alcohols);
Ketones (substituted and un-substituted, particularly C2-C5 ketones);
Aldehydes (substituted and un-substituted, particularly C2-C5 aldehydes);
Ethers/Diethers (substituted and un-substituted, particularly C2-C5 ethers);
Fluoroethers (substituted and un-substituted, particularly C2-C5 fluoroethers);
Fluoroalkenes (substituted and un-substituted, particularly C2-C6 fluoroalkenes);
CFC (particularly C2-C5 CFCs)
HFC (particularly C2-C5 HFCs);
HCC (particularly C2-C5 HCCs);
HCFC (particularly C2-C5 HCFCs);
Haloalkenes, including preferably fluoroalkenes (substituted and un-substituted, particularly C2-C6 fluoroalkenes);
HFO (particularly C2-C5 HFOs);
HClFO (particularly C2-C5HClFOs);
HBrFO (particularly C2-C5 HBrFOs);
Carbonates/dicarbonates;
Carboxylic acid and derivatives thereof (eg. carboxylic acid esters, such as methyl formate); and
Water.

As used herein, the term "HFO" means compounds that consist of atoms of carbon, fluorine and hydrogen, and no other atoms, and in which there is at least one carbon-carbon double bond.

As used herein, the term "HClFO" means compounds that consist of atoms of carbon, chlorine, fluorine and hydrogen, and no other atoms, and in which there is at least one carbon-carbon double bond.

As used herein, the term "HBrFO" means compounds that consist of atoms of carbon, bromine, fluorine and hydrogen, and no other atoms, and in which there is at least one carbon-carbon double bond.

As used throughout the specification and claims, the designations C1-C5 and like usages, refer to compounds having at least one carbon atom and up to about five carbon atoms, etc.

While it is contemplated that a wide variety of HFCs may be used in the present compositions and methods, in certain preferred embodiments it is preferred to use in the compositions one or more of the following (including any and all isomers of each):

Difluoromethane (HFC-32);
Pentafluoroethane (HFC-125);
1,1,2,2-tetrafluoroethane (HFC-134);
1,1,1,2-Tetrafluoroethane (HFC-134a);
Trifluorethane (HFC-143a);
Difluoroethane (HFC-152a);
1,1,1,2,3,3,3-Heptafluoropropane (HFC-227ea);
1,1,1,3,3,3-hexafluoropropane (HFC-236fa);
1,1,1,3,3-pentafluoropropane (HFC-245fa); and
1,1,1,3,3-pentafluorobutane (HFC-365mfc).

While it is contemplated that a wide variety of HCFCs may be used in the present compositions and methods, in certain preferred embodiments it is preferred to use separately or in any combination: dichlorotrifluoroethanes (such as 2,2-dichloro-1,1,1 trifluoroethane (HCFC-123)); and chlorotetrafluoroethane (HCFC-124), including any and all isomers of each.

While it is contemplated that a wide variety of HCCs may be used in the present compositions and methods, in certain preferred embodiments it is preferred to use separately or in any combination: dichloroethenes (such as 1,2-dichloroethane, including trans-1,2-dichloroethyene); ethylchloride; and 2-chloropropane.

While it is contemplated that a wide variety of CFCs may be used in the present compositions and methods, in certain preferred embodiments it is preferred to use trichlorotrifluoroethanes (such as 1,1,2-trichlorotrifluoroethane (CFC-113)), especially for use as a monomer for the production of oligomers and/or polymers.

While it is contemplated that a wide variety of fluoroalkenes may be used in the present compositions and methods, it is particularly preferred in many embodiments that the compositions comprise one or more C3 or C4 fluoroalkenes, preferably compounds having Formula I as follows:

where X is a $C_2$ or a $C_3$ unsaturated, substituted or unsubstituted, alkyl radical, each R is independently Cl, F, Br, I or H, and z is 1 to 3. Highly preferred among the compounds of Formula I are the following compounds:
fluoroethenes
fluorpropenes;
fluorobutenes;
chlorofluorethenes;
chlorofluoropropenes; and
chlorofluorobutenes.

Among the fluoroethenes, preferred for use in certain embodiments of the present invention are: $C_2H_3F$ (monofluoroethylene or Vinyl Fluoride or VF); $C_2H_2F_2$ (such as 1,1-Difluoroethylene (Vinylidene Fluoride or VDF); $C_2HF_3$ (trifluoroethylene or THFE); and $C_2F_4$ (tetrafluoroethylene or TFE).

Among the fluoropropenes, preferred for use in certain embodiments of the present invention are: $C_3H_3F_3$ (including all isomers, such as 3,3,3-trifluoropropene (HFO-1243zf); $C_3H_2F_4$ (such as cis- and trans-isomers of 1,3,3,3-etrafluoropro3pene (HFO-1234ze), and 2,3,3,3-tetrafluoropropene (HFO-1234yf)); and $C_3HF_5$ (such as isomers of HFO-1225).

The term "HFO-1234" is used herein to refer to all tetrafluoropropenes. Among the tetrafluoropropenes is included HFO-1234yf and any and all stero- or geometric isomers thereof. The terms HFO-1234yf and HFO-1234ze are used herein generically to refer to 1,1,1,2-tetrafluoropropene and 1,1,1,3-tetrafluoropropene, respectively, independent of its stero isometry.

HFO-1234 compounds are known materials and are listed in Chemical Abstracts databases. The production of fluoropropenes such as $CF_3CH=CH_2$ by catalytic vapor phase fluorination of various saturated and unsaturated halogen-containing $C_3$ compounds is described in U.S. Pat. Nos. 2,889,379; 4,798,818 and 4,465,786, each of which is incorporated herein by reference. EP 974,571, also incorporated herein by reference, discloses the preparation of 1,1,1,3-tetrafluoropropene by contacting 1,1,1,3,3-pentafluoropropane (HFC-245fa) in the vapor phase with a chromium-based catalyst at elevated temperature, or in the liquid phase with an alcoholic solution of KOH, NaOH, $Ca(OH)_2$ or $Mg(OH)_2$.

Among the fluorobutenes, preferred for use in certain embodiments of the present invention are: $C_4H_4F_4$ (including all isomers thereof); $C_4H_3F_5$ (such as all isomers of HFO-1345); and $C_4H_2F_6$ (such as all isomers of HFO-1336).

Among the chlorofluoroethenes, preferred for use in certain embodiments of the present invention are: $C_2F_3Cl$ (CTFE).

Among the chlorofluoropropenes, preferred for use in certain embodiments of the present invention are mono- or dichlorinated compounds, including for example: $C_3H_2F_4Cl$ (such as 2-chloro-3,3,3-trifluoro-1-propene (including HCFO-1233xf) and 1-chloro-3,3,3-trifluoro-1-propene (including all isomers of HCFO-1233zd).

In certain preferred embodiments of the present invention, the compositions include at least one fluoroalkenes of Formula II below:

where each R is independently Cl, F, Br, I or H
R' is $(CR_2)_nY$,
Y is $CRF_2$
and n is 0 or 1.

In highly preferred embodiments, Y is $CF_3$, n is 0 and at least one of the remaining Rs is F.

Applicants believe that, in general, the compounds of the above identified Formulas I and II, when included in the present compositions, are generally effective and exhibit utility all of the uses identified above, including particularly in refrigerant compositions, blowing agent compositions, compatibilizers, aerosols, propellants, fragrances, flavor formulations, and solvent compositions of the present invention. However, applicants have surprisingly and unexpectedly found that certain of the compounds having a structure in accordance with the formulas described above exhibit a highly desirable low level of toxicity compared to other of such compounds. As can be readily appreciated, this discovery is of potentially enormous advantage and benefit for the formulation of not only refrigerant compositions, but also any and all compositions, which would otherwise contain relatively toxic compounds satisfying the formulas described above. More particularly, applicants believe that a relatively low toxicity level is associated with compounds of Formula II, preferably wherein Y is $CF_3$, wherein at least one R on the unsaturated terminal carbon is H, and at least one of the remaining Rs is F. Applicants believe also that all structural, geometric and stereoisomers of such compounds are effective and of beneficially low toxicity.

In highly preferred embodiments, especially embodiments comprising the low toxicity compounds described above, n is zero. In certain highly preferred embodiments the compositions of the present invention comprise one or more tetrafluoropropenes. The term "HFO-1234" is used herein to refer to all tetrafluoropropenes. Among the tetrafluoropropenes, HFO-1234yf is highly preferred for use in connection with heat transfer compositions, methods and systems.

In other embodiments, it may be preferred to use either or both cis- and trans-1,3,3,3-tetrafluoropropene (HFO-1234ze). The term HFO-1234ze is used herein generically to refer to 1,3,3,3-tetrafluoropropene, independent of whether it is the cis- or trans-form. The terms "cisHFO-1234ze" and "transHFO-1234ze" are used herein to describe the cis- and trans-forms of 1,3,3,3-tetrafluoropropene respectively. The term "HFO-1234ze" therefore includes within its scope cisHFO-1234ze, transHFO-1234ze, and all combinations and mixtures of these. Although the properties of cisHFO-1234ze and transHFO-1234ze differ in at least some respects, it is contemplated that each of these compounds is adaptable for use, either alone or together with other compounds including its stereoisomer, in connection with each of the applications, methods and systems described herein. For example, while transHFO-1234ze may be preferred for use in certain refrigeration systems because of its relatively low boiling point (−19° C.), it is nevertheless contemplated that cisHFO-1234ze, with a boiling point of +9° C., also has utility in certain refrigeration systems of the present invention. Accordingly, it is to be understood that the terms "HFO-1234ze" and 1,3,3,3-tetrafluoropropene refer to both stereo isomers, and the use of this term is intended to indicate that each of the cis- and trans-forms applies and/or is useful for the stated purpose unless otherwise indicated.

HFO-1234 compounds are known materials and are listed in Chemical Abstracts databases. The production of fluoropropenes such as CF3CH=CH2 by catalytic vapor phase fluorination of various saturated and unsaturated halogen-containing C3 compounds is described in U.S. Pat. Nos. 2,889,379; 4,798,818 and 4,465,786, each of which is incorporated herein by reference. EP 974,571, also incorporated herein by reference, discloses the preparation of 1,1,1,3-tetrafluoropropene by contacting 1,1,1,3,3-pentafluoropropane (HFC-245fa) in the vapor phase with a chromium-based catalyst at elevated temperature, or in the liquid phase with an alcoholic solution of KOH, NaOH, Ca(OH)2 or Mg(OH)2. In addition, methods for producing compounds in accordance with the present invention are described, by way of nonlimiting example, in connection with pending U.S. patent application Ser. No. 10/694,272 "Process for Producing Fluoropropenes" and in United States Provisional Application 60/733,355, filed Nov. 3, 2005, each of which is incorporated herein by reference.

The present compositions, particularly those comprising HFO-1234, and HFO-1234yf, are believed to possess properties that are advantageous for a number of important reasons. For example, applicants believe, based at least in part on mathematical modeling, that the fluoroolefins of the present invention will not have a substantial negative affect on atmospheric chemistry, being negligible contributors to ozone depletion in comparison to some other halogenated species. The preferred compositions of the present invention thus have the advantage of not contributing substantially to ozone depletion. The preferred compositions also do not contribute substantially to global warming compared to many of the hydrofluoroalkanes presently in use.

The amount of the Formula I compounds, particularly HFO-1234, contained in the present compositions can vary widely, depending the particular application, and compositions containing more than about 1% by weight and less than 100% of the compound are within broad the scope of the present invention. In preferred embodiments, the present compositions comprise HFO-1234, preferably HFO-1234yf, in amounts from about 5% by weight to about 99% by weight, and even more preferably from about 5% to about 95%.

By way of illustration, but not necessarily by way of limitation, certain preferred embodiments of the present compositions may comprise, in addition to the iodocarbon compounds of the present invention (and in addition to the stabilizer compound when present), fluoroalkene compounds of the present invention and/or HFCs in accordance with broad, intermediate and more specific composition ranges (all amounts understood to be preceded by "about") are indicated in the table below, with the percentages being based on the total weight of the three components indicated in the Table 1 below.

TABLE 1

| | BROAD, wt % | INTERMEDIATE, wt % | MORE SPECIFIC wt % |
|---|---|---|---|
| Fluoralkene(s) | 0-95 | 5-85 | 5-80 or 0 |
| Iodocarbon(s) | >0-99 | 10-90 | 15-90 or 60-80 |
| HFC(s) | 0-95 | 5-85 | 5-80 or 20-40 |

Certain preferred embodiments of the present compositions may comprise, in addition to the stabilizer which is preferably present and any oil or lubricant that is also preferably present in the heat transfer fluids in accordance with the present invention, $CF_3I$ and one or more fluoroalkene compounds. In certain preferred forms the fluoroalkene consists essentially of tetrafluoropropene, more preferably HFO-1234yf. Broad, intermediate and more specific composition ranges (all amounts understood to be preceded by "about") are indicated in the table below, with the percentages being based on the total of the components is indicated in the Table 2 below.

TABLE 2

| | BROAD, wt % | INTERMEDIATE, wt % | MORE SPECIFIC, wt % |
|---|---|---|---|
| Fluoralkene(s) (pref. HFO-1234yf) | 10-95 | 50-90 | 60-80 |
| $CF_3I$ | >0-<90 | 10-50 | 20-40 |

Certain highly preferred embodiments of the present invention comprise heat transfer fluids, particularly for use in automotive air conditioning systems, comprising from about 65 to about 75 wt % of HFO-1234yf and from about 25 to about 35 wt % CF3I, and even more preferably about 70 wt % of HFO-1234yf and about 30 wt % CF₃I, said percentages being based on the total combined weight of HFO and CF₃I.

Certain preferred embodiments of the present compositions may comprise, in addition to any stabilizer that is present in accordance with the present invention, CF₃I, certain fluoroalkene compounds (preferably HFO-1234ze) of the present invention, and/or certain HFCs (preferably HFC-152a) in accordance with broad, intermediate and more specific composition ranges (all amounts understood to be preceded by "about") as indicated in the table below, with the percentages being based on the total of the three components indicated in the Table 3.

TABLE 3

|  | BROAD, wt % | INTERMEDIATE, wt % | MORE SPECIFIC, wt % |
| --- | --- | --- | --- |
| Fluoralkene(s) (pref. HFO-1234ze) | 0-85 | 0-85 | 0 |
| CF₃I | >0-<100 | 10-<100 | 60-80 |
| HFC(s) (pref. HFC-152a) | 0-95 | 25-90 | 20-40 |

Certain preferred embodiments of the present compositions may comprise, in addition to the stabilizer of the present invention, CF₃I, certain fluoroalkene compounds of the present invention, and/or certain HFCs (preferably HFC-32) in accordance with broad, intermediate and more specific composition ranges (all amounts understood to be preceded by "about") as indicated in the table below, with the percentages being based on the total of the three components indicated in the Table 4.

TABLE 4

|  | BROAD, wt % | INTERMEDIATE, wt % | MORE SPECIFIC, wt % |
| --- | --- | --- | --- |
| Fluoralkene(s) | 0-75 | 0-75 | 0-75 |
| CF₃I | >0-40 | >1-33 | >1-15 |
| HFC(s) (pref. HFC-32) | 50-<100 | 65-<95 | 85-99 |

2—Lubricants

According to certain aspects of the present invention, the composition comprises, in addition to the iodocarbon compound(s), a lubricant or oil. Any of a variety of conventional lubricants may be used in the compositions of the present invention. Such compositions are especially well adapted for use as refrigerants in heating or cooling cycle equipment, as explained more fully hereinafter. The composition then contains a at least one lubricant having hydrogen atoms and carbon atoms, wherein no more than 17% of the total number of hydrogen atoms which are attached to a carbon atom are tertiary hydrogen atoms. Preferably the lubricant has less than 1% of the total number of hydrogen atoms which are attached to a carbon atom are tertiary hydrogen atoms, and more preferably has no tertiary hydrogen atoms, that is wherein about 0% of the total number of hydrogen atoms which are attached to a carbon atom are tertiary hydrogen atoms.

It preferably also has a relatively low percentage of oxygen, and preferably no oxygen in the molecule. It is also generally preferred to use a lubricant or oil having little inherent concentration of polar solvent, particularly water. An important requirement for the lubricant is that there must be enough lubricant returning to the compressor of the system such that the compressor is lubricated. Thus suitability of the lubricant is determined partly by the refrigerant/lubricant characteristics and partly by the system characteristics. Examples of suitable lubricants include mineral oil, alkyl benzenes, including a synthetic lubricant, specifically polyalkyleneglycol (PAG) lubricant, and preferably a PAG consisting essentially of 2 or more oxypropylene groups and having a viscosity of from about 10 to about 200 centistokes at about 37.degree.C. (sold under the trade designation ND-8 by Idemitsu Kosan), and PAG sold under the trade designation RL-897 by DOW, polyvinyl ethers (PVEs), and the like. Preferred lubricants include a naphthenic mineral oil, a paraffinic mineral oil, an ester oil, a polyalkylene glycol, a polyvinyl ether, an alkyl benzene, a polyalphaolefin, a polyester, a polyol ester, or combinations thereof. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Mixtures of different lubricants may be used.

In one aspect of the present invention involves a selection of a lubricant comprising in major proportion by weight, and even more preferably at least about 75% by weight of alkyl benzene-based compounds, mineral oil compounds, and combinations of these. With respect to alkyl benzene, applicants have found that such compounds are preferred from among the numerous other lubricant compounds which have heretofore been available due to the relatively high level of miscibility in the preferred refrigerant compositions and the relatively high level of stability that such molecules exhibit in the heat transfer compositions and the heat transfer systems of the present invention. Another preferred molecule for use in connection with the present invention is referred to herein, by way of convenience but not by way of limitation, as ethylene oxide/propylene oxide (EO/PO) molecules. Such molecules in preferred embodiments have the structure indicated below:

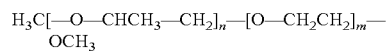

Applicants have found that such EO/PO molecules, which are also referred to herein as "dual capped EO/PO molecules" due to the presence of the methyl radical on each end of the molecule, or alternatively other relatively low chain length alkyl group" can provide the ability to adjust, to suit each particular application, the n and the m values. In this way, a lubricant molecule can be selected to achieve a highly advantageous combination of miscibility and stability. An advantage that dual capped molecules perform substantially better in many respects and similar molecules which are only capped at one end, as illustrated in the examples below. U.S.

Pat. No. 4,975,212, which is incorporated herein by reference, discloses techniques for capping molecules of this type. Although it is not generally preferred, is also possible to combine the preferred lubricants of the present invention with one or more conventional lubricants.

Suitable polyol ester lubricants suitable for air conditioning or refrigeration use are typically prepared by the condensation of a poly alcohol or polyol compound such as pentaerythritol, dipentaerythritol, neopentyl glycol or trimethylpropanol with either pure or mixed, linear or branched aliphatic carboxylic acids such as a linear or branched monocarboxylic acid having from about 4 to about 10 carbon atoms. Polyol ester base stocks polyols are available from Hatco Corporation. For example Hatcol 3307 is a pure polyol ester basestock based on neopentyl glycol. Hatcol 3329 and Hatcol 3504 are a pure polyol ester refrigeration base stocks based on pentaerythritol mixed fatty acids esters. Hatcol 3316 is a polyol ester of dipentaerythritol and short chain fatty acids. Other examples of such polyol ester lubricant formulations include the Cognis ProEco™ line of Polyol ester refrigeration lubricants, ICI's EMKARATE RL line of polyol esters, as well as polyol ester lubricants provided by Lubrizol subsidiary CPI Engineering Services, Inc. such as Solest. Preferred compositions according to the invention, include a lubricant in amounts of from about 20 wt. % to about 50 wt. %, preferably from about 20 wt. % to about 30 wt. % by weight of the composition.

3—Other Components

Any of a variety of other additives may be used in the compositions of the present invention. Examples of suitable additives include metal passivators such as nitromethane, extreme pressure (EP) additives that improve the lubricity and load bearing characteristics of the lubricant. Examples of EP additives are described in U.S. Pat. No. 4,755,316 (Table D) and incorporated here. Examples of EP additives are organophosphates including Lubrizol® 8478 manufactured by the Lubrizol Corporation. Corrosion inhibitors are also useful and disclosed in U.S. Pat. No. 4,755,316, Table D.

II. Heat Transfer Compositions

Although it is contemplated that the compositions of the present invention may include each of the compounds mentioned herein in widely ranging amounts, it is generally preferred that heat transfer compositions, and particularly refrigerant compositions of the present invention comprise iodocarbon compound(s), and even more preferably C1-C3 iodofluorocarbon compounds, in an amount that is at least about 25% by weight of the composition. In certain preferred embodiments in which the composition comprises HFC and particularly HFC-152a, the compositions comprise at least about 40% by weight, and even more preferably at least about 50% by weight of HFC-152a.

Preferred refrigerant or heat transfer compositions according to the present invention, especially those used in vapor compression systems, include a lubricant, generally in amounts of from about 30 to about 50% by weight of the composition. An important requirement for the lubricant is that there must be enough lubricant returning to the compressor of the system such that the compressor is lubricated. Thus suitability of the lubricant is determined partly by the refrigerant/lubricant characteristics and partly by the system characteristics. Examples of suitable lubricants include mineral oil, alkyl benzenes, polyol esters, including polyalkylene glycols, polyvinyl ethers (PVEs), and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Preferred forms of the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference.

Many existing refrigeration systems are currently adapted for use in connection with existing refrigerants, and certain compositions of the present invention are believed to be adaptable for use in many of such systems, either with or without system modification. In many applications the compositions of the present invention may provide an advantage as a replacement in systems, which are currently based on refrigerants having a relatively high capacity. Furthermore, in embodiments where it is desired to use a lower capacity refrigerant composition of the present invention, for reasons of cost for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments comprising a major proportion of transHFO-1234yf, as a replacement for existing refrigerants, such as HFC-134a. In certain applications, the refrigerants of the present invention potentially permit the beneficial use of larger displacement compressors, thereby resulting in better energy efficiency than other refrigerants, such as HFC-134a. Therefore the refrigerant compositions of the present invention, particularly compositions comprising transHFP-1234ze, provide the possibility of achieving a competitive advantage on an energy basis for refrigerant replacement applications.

It is contemplated that the compositions of the present, including particularly those comprising HFO-1234 (and particularly HFO-1234yf), also have advantage (either in original systems or when used as a replacement for refrigerants such as R-12 and R-500), in chillers typically used in connection with commercial air conditioning systems. In certain of such embodiments it is preferred to include in the present HFO-1234 compositions from about 0.5 to about 60% of a flammability suppressant, more preferably from about 20 to about 50 wt %, preferably an iodocarbon such as $CF_3I$ in accordance with the present invention.

The present methods, systems and compositions are thus adaptable for use in connection with automotive air conditioning systems and devices, commercial refrigeration systems and devices, chillers, residential refrigerator and freezers, general air conditioning systems, heat pumps, ORCs, CRCs and the like.

III. Blowing Agents, Foams and Foamable Compositions

Blowing agents may also comprise or constitute one or more of the present compositions. As mentioned above, the compositions of the present invention may include the iodocarbon compound(s) and the diene-based compound(s) of the present invention in widely ranging amounts. It is generally preferred, however, that for preferred compositions for use as blowing agents in accordance with the present invention the iodocarbon compound(s) are present in an amount that is at least about 1% by weight, and even more preferably at least about 50% by weight, of the composition.

In certain preferred embodiments, the blowing agent compositions of the present invention and include, in addition to HFO-1234 (preferably HFO-1234ze) one or more of the following components as a co-blowing agent, filler, vapor pressure modifier, or for any other purpose:

Difluoromethane (HFC-32);
Pentafluoroethane (HFC-125);
1,1,2,2-tetrafluoroethane (HFC-134);
1,1,1,2-Tetrafluoroethane (HFC-134a);
Difluoroethane (HFC-152a);
1,1,1,2,3,3,3-Heptafluoropropane (HFC-227ea);
1,1,1,3,3,3-hexafluoropropane (HFC-236fa);
1,1,1,3,3-pentafluoropropane (HFC-245fa);
1,1,1,3,3-pentafluorobutane (HFC-365mfc);
Water;
$CO_2$;
methyl formate and its derivatives;
alcohols (C1-C4) and derivatives thereof;
ketones and derivatives thereof;
aldehydes and derivatives thereof;
ethers/diethers and derivatives thereof;
carbonates and derivatives thereof;
dicarbonates and derivatives thereof;
and carboxylic acids and their derivatives.

It is contemplated that the blowing agent compositions of the present invention may comprise cisHFO-1234ze, transHFO1234ze or combinations thereof. In certain preferred embodiments, the blowing agent composition of the present invention comprise a combination of cisHFO-1234ze and transHFO1234ze in a cis:trans weight ratio of from about 1:99 to about 30:70, and even more preferably from about 1:99 to about 5:95.

In other embodiments, the invention provides foamable compositions, and preferably polyurethane, polyisocyanurate, phenolic foams, extruded thermoplastic foam compositions, integral skin foams and one or two component pressurized froth foams prepared using the compositions of the present invention. In such foam embodiments, one or more of the present compositions are included as or part of a blowing agent in a foamable composition, which composition preferably includes one or more additional components capable of reacting and/or foaming under the proper conditions to form a foam or cellular structure, as is well known in the art. The invention also relates to foam, and preferably closed cell foam, prepared from a polymer foam formulation containing a blowing agent comprising the compositions of the invention. In yet other embodiments, the invention provides foamable compositions comprising thermoplastic foams, such as such as polystyrene (PS), polyethylene (PE), polypropylene (PP) and polyethyleneterpthalate (PET) foams, preferably low-density foams.

In certain preferred embodiments, dispersing agents, cell stabilizers, surfactants and other additives may also be incorporated into the blowing agent compositions of the present invention. Surfactants are optionally but preferably added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748; 2,917,480; and 2,846,458, each of which is incorporated herein by reference. Other optional additives for the blowing agent mixture may include flame retardants such as tri(2-chloroethyl)phosphate, tri(2-chloropropyl)phosphate, tri(2,3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

IV. Propellant Compositions

In another aspect, the present invention provides propellant compositions comprising or consisting essentially of a composition of the present invention, such propellant compositions preferably being sprayable compositions. The propellant compositions of the present invention preferably comprise a material to be sprayed and a propellant comprising, consisting essentially of, or consisting of a composition in accordance with the present invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications, and any other medication or the like, including preferably any other medicament or agent intended to be inhaled. The medicament or other therapeutic agent is preferably present in the composition in a therapeutic amount, with a substantial portion of the balance of the composition comprising a compound of Formula I of the present invention, preferably HFO-1234, and even more preferably HFO-1234ze.

Aerosol products for industrial, consumer or medical use typically contain one or more propellants along with one or more active ingredients, inert ingredients or solvents. The propellant provides the force that expels the product in aerosolized form. While some aerosol products are propelled with compressed gases like carbon dioxide, nitrogen, nitrous oxide and even air, most commercial aerosols use liquefied gas propellants. The most commonly used liquefied gas propellants are hydrocarbons such as butane, isobutane, and propane. Dimethyl ether and HFC-152a (1,1-difluoroethane) are also used, either alone or in blends with the hydrocarbon propellants. Unfortunately, all of these liquefied gas propellants are highly flammable and their incorporation into aerosol formulations will often result in flammable aerosol products.

Applicants have come to appreciate the continuing need for nonflammable, liquefied gas propellants with which to formulate aerosol products. The present invention provides compositions of the present invention, particularly and preferably compositions comprising HFO-1234, and even more preferably HFO-1234ze and/or HFO-1234yf, for use in certain industrial aerosol products, including for example spray cleaners, lubricants, and the like, and in medicinal aerosols, including for example to deliver medications to the lungs or mucosal membranes. Examples of this includes metered dose inhalers (MDIs) for the treatment of asthma and other chronic obstructive pulmonary diseases and for delivery of medicaments to accessible mucous membranes or intranasally. The present invention thus includes methods for treating ailments, diseases and similar health related problems of an organism (such as a human or animal) comprising applying a composition of the present invention containing a medicament or other therapeutic component to the organism in need of treatment. In certain preferred embodiments, the step of applying the present composition comprises providing a MDI containing the composition of the present invention (for example, introducing the composition into the MDI) and then discharging the present composition from the MDI.

The compositions of the present invention, particularly compositions comprising or comprising in major proportion HFO-1234 (preferably HFO-1234ze and/or HFO-1234yf), are capable of providing nonflammable, liquefied gas propellant and aerosols that do not contribute substantially to global warming. The present compositions can be used to formulate a variety of industrial aerosols or other sprayable compositions such as contact cleaners, dusters, lubricant sprays, and the like, and consumer aerosols such as personal care products, household products and automotive products. HFO-1234ze is particularly preferred for use as an important component of propellant compositions for in medicinal aerosols such as metered dose inhalers. The medicinal aerosol and/or propellant and/or sprayable compositions of the present invention in many applications include, in addition to compound of formula (I) or (II) (preferably HFO-1234ze), a medicament such as a beta-agonist, a corticosteroid or other medicament, and, optionally, other ingredients, such as surfactants, solvents, other propellants, flavorants and other excipients. The compositions of the present invention, unlike many compositions previously used in these applications, have good environmental properties and are not considered to be potential contributors to global warming. The present compositions therefore provide in certain preferred embodiments substantially nonflammable, liquefied gas propellants having very low Global Warming potentials.

V. Flavorants and Fragrances

The compositions of the present invention also provide advantage when used as part of, and in particular as a carrier for, flavor formulations and fragrance formulations. The suitability of the present compositions for this purpose is demonstrated by a test procedure in which 0.39 grams of Jasmone were put into a heavy walled glass tube. 1.73 grams of R-1234ze were added to the glass tube. The tube was then frozen and sealed. Upon thawing the tube, it was found that the mixture had one liquid phase. The solution contained 20 wt. % Jasome and 80 wt. % R-1234ze, thus establishing its favorable use as a carrier or part of delivery system for flavor formulations, in aerosol and other formulations. It also establishes its potential as an extractant of fragrances, including from plant matter. In certain embodiments, it may be preferred to use the present composition in extraction applications with the present fluid in its supercritical state. This and other applications of involving use of the present compositions in the supercritical or near supercritical state are described hereinafter.

VI. Stabilizer Compositions

The present invention provides in one aspect a stabilizer composition for use as an additive in any one of the above-noted compositions, or more generally as an additive for any composition, which contains or will be exposed to iodocarbon compound(s). In such compositions, therefore, there is no requirement for the presence of iodocarbon compound(s), but the presence of a diene-based compound as described above is required. In preferred embodiments, the stabilizer composition of the present invention comprises a combination of diene-based compound(s) and at least one additional stabilizer selected from the group of additional stabilizers described above, preferably selected from the group consisting of phenol compound(s), epoxy compound(s), phosphites, phosphates and combinations of these.

VI. Methods and Systems

The compositions of the present invention are useful in connection with numerous methods and systems, including as heat transfer fluids in methods and systems for transferring heat, such as refrigerants used in refrigeration, air conditioning and heat pump systems. The present compositions are also advantageous for use in systems and methods of generating aerosols, preferably comprising or consisting of the aerosol propellant in such systems and methods. Methods of forming foams and methods of extinguishing and suppressing fire are also included in certain aspects of the present invention. The present invention also provides in certain aspects methods of removing residue from articles in which the present compositions are used as solvent compositions in such methods and systems.

A. Heat Transfer Methods

The preferred heat transfer methods generally comprise providing a composition of the present invention and causing heat to be transferred to or from the composition, preferably by changing the phase of the composition and/or by sensible heat transfer. For example, the present methods provide cooling by absorbing heat from a fluid or article, preferably by evaporating the present refrigerant composition in the vicinity of the body or fluid to be cooled to produce vapor comprising the present composition. Preferably the methods include the further step of compressing the refrigerant vapor, usually with a compressor or similar equipment to produce vapor of the present composition at a relatively elevated pressure. Generally, the step of compressing the vapor results in the addition of heat to the vapor, thus causing an increase in the temperature of the relatively high pressure vapor. Preferably, the present methods include removing from this relatively high temperature, high pressure vapor at least a portion of the heat added by the evaporation and compression steps. The heat removal step preferably includes condensing the high temperature, high pressure vapor while the vapor is in a relatively high pressure condition to produce a relatively high pressure liquid comprising a composition of the present invention. This relatively high pressure liquid preferably then undergoes a nominally isoenthalpic reduction in pressure to produce a relatively low temperature, low pressure liquid. In such embodiments, it is this reduced temperature refrigerant liquid which is then vaporized by heat transferred from the body or fluid to be cooled.

In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above.

B. Foam Blowing Methods

One embodiment of the present invention relates to methods of forming foams, and preferably polyurethane and polyisocyanurate foams. The methods generally comprise providing a blowing agent composition of the present invention, adding (directly or indirectly) the blowing agent composition to a foamable composition, and reacting the foamable composition under conditions effective to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives.

It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, blowing agents, and even other polyols can be added as a third stream to the mix head or reaction site. Also optionally, each of these components can be added partially to the B-component and partially as a third stream to the mix head or reaction site. Most preferably, however, they are all incorporated into one B-component as described above.

It is also possible to produce thermoplastic foams using the compositions of the invention. For example, conventional polystyrene and polyethylene formulations may be combined with the compositions in a conventional manner to produce rigid foams.

C. Cleaning Methods

The present invention also provides methods of removing containments from a product, part, component, substrate, or any other article or portion thereof by applying to the article a composition of the present invention. For the purposes of convenience, the term "article" is used herein to refer to all such products, parts, components, substrates, and the like and is further intended to refer to any surface or portion thereof. Furthermore, the term "contaminant" is intended to refer to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant" as used herein is intended to cover and encompass such a photo resist material.

Preferred methods of the present invention comprise applying the present composition to the article. Although it is contemplated that numerous and varied cleaning techniques can employ the compositions of the present invention to good advantage, it is considered to be particularly advantageous to use the present compositions in connection with supercritical cleaning techniques. Supercritical cleaning is disclosed in U.S. Pat. No. 6,589,355, which is assigned to the assignee of the present invention and incorporated herein by reference. For supercritical cleaning applications, is preferred in certain embodiments to include in the present cleaning compositions, in addition to the HFO-1234 (preferably HFO-1234ze), one or more additional components, such as $CO_2$ and other additional components known for use in connection with supercritical cleaning applications. It may also be possible and desirable in certain embodiments to use the present cleaning compositions in connection with particular vapor degreasing and solvent cleaning methods, with vapor degreasing and solvent cleaning methods being particularly preferred for certain applications, especially those involving intricate parts and difficult to remove soils. Preferred vapor degreasing and solvent cleaning methods consist of exposing an article, preferably at room temperature, to the vapors of a boiling solvent. Vapors condensing on the object have the advantage of providing a relatively clean, distilled solvent to wash away grease or other contamination. Such processes thus have an additional advantage in that final evaporation of the present solvent composition from the object leaves behind relatively little residue as compared to the case where the object is simply washed in liquid solvent.

For applications in which the article includes contaminants that are difficult to remove, it is preferred that the present methods involve raising the temperature of the solvent composition of the present invention above ambient or to any other temperature that is effective in such application to substantially improve the cleaning action of the solvent. Such processes are also generally preferred for large volume assembly line operations where the cleaning of the article, particularly metal parts and assemblies, must be done efficiently and quickly.

In preferred embodiments, the cleaning methods of the present invention comprise immersing the article to be cleaned in liquid solvent at an elevated temperature, and even more preferably at about the boiling point of the solvent. In such operations, this step preferably removes a substantial amount, and even more preferably a major portion, of the target contaminant from the article. This step is then preferably followed by immersing the article in solvent, preferably freshly distilled solvent, which is at a temperature below the temperature of the liquid solvent in the preceding immersion step, preferably at about ambient or room temperature. The preferred methods also include the step of then contacting the article with relatively hot vapor of the present solvent composition, preferably by exposing the article to solvent vapors rising from the hot/boiling solvent associated with the first mentioned immersion step. This preferably results in condensation of the solvent vapor on the article. In certain preferred embodiments, the article may be sprayed with distilled solvent before final rinsing.

It is contemplated that numerous varieties and types of vapor degreasing equipment are adaptable for use in connection with the present methods. One example of such equipment and its operation is disclosed by Sherliker et al. in U.S. Pat. No. 3,085,918, which is incorporated herein by reference. The equipment disclosed in Sherliker et al includes a boiling sump for containing a solvent composition, a clean sump for containing distilled solvent, a water separator, and other ancillary equipment.

The present cleaning methods may also comprise cold cleaning in which the contaminated article is either immersed in the fluid composition of the present invention under ambient or room temperature conditions or wiped under such conditions with rags or similar objects soaked in solvents.

Certain preferred cleaning methods comprise flushing the substrate with a composition in accordance with the present invention.

D. Flammability Reduction Methods

According to certain other preferred embodiments, the present invention provides methods for reducing the flammability of fluids, said methods comprising adding a compound or composition of the present invention to said fluid. The flammability associated with any of a wide range of otherwise flammable fluids may be reduced according to the present invention. For example, the flammability associated with fluids such as ethylene oxide, flammable hydrofluorocarbons and hydrocarbons, including: HFC-152a, 1,1,1-trifluoroethane (HFC-143a), difluoromethane (HFC-32), propane, hexane, octane, and the like can be reduced according to the present invention. For example, certain compositions according to the present invention may include $CF_3I$ and HFC-152a in amounts, based on the total weight of these two components, of from greater than 0 to about 38.5% of $CF_3I$, more preferably from greater than 0 to about 35% of $CF_3I$, and from about 61.5 to less than 100, and even more preferably from about 65 to less than about 100 of HFC-152a. For the purposes of the present invention, a flammable fluid may be any fluid exhibiting flammability ranges in air as measured via any standard conventional test method, such as ASTM E-681, and the like.

Any suitable amounts of the present compounds or compositions may be added to reduce flammability of a fluid according to the present invention. As will be recognized by those of skill in the art, the amount added will depend, at least in part, on the degree to which the subject fluid is flammable and the degree to which it is desired to reduce the flammability thereof. In certain preferred embodiments, the amount of compound or composition added to the flammable fluid is effective to render the resulting fluid substantially non-flammable.

E. Flame Suppression Methods

The present invention further provides methods of suppressing a flame, said methods comprising contacting a flame with a fluid comprising a compound or composition of the present invention. Any suitable methods for contacting the flame with the present composition may be used. For example, a composition of the present invention may be sprayed, poured, and the like onto the flame, or at least a portion of the flame may be immersed in the composition. In light of the teachings herein, those of skill in the art will be readily able to adapt a variety of conventional apparatus and methods of flame suppression for use in the present invention.

F. Sterilization Methods

Many articles, devices and materials, particularly for use in the medical field, must be sterilized prior to use for the health and safety reasons, such as the health and safety of patients and hospital staff. The present invention provides methods of sterilizing comprising contacting the articles, devices or material to be sterilized with a compound or composition of the present invention. Such methods may be either high or low-temperature sterilization methods. In certain embodiments, high-temperature sterilization comprises exposing the articles, device or material to be sterilized to a hot fluid comprising a compound or composition of the present invention at a temperature of from about 250° F. to about 270° F., preferably in a substantially sealed chamber. The process can be completed usually in less than about 2 hours. However, some articles, such as plastic articles and electrical components, cannot withstand such high temperatures and require low-temperature sterilization.

Low-temperature sterilization of the present invention involves the use of a compound or composition of the present invention at a temperature of from about 100 to about 200EF. The compounds of the present invention may be combined with other common chemical sterilants, including, for example, ethylene oxide (EO), formaldehyde, hydrogen peroxide, chlorine dioxide, and ozone to form a sterilant composition of the present invention.

The low-temperature sterilization of the present invention is preferably at least a two-step process performed in a substantially sealed, preferably air tight, chamber. In the first step (the sterilization step), the articles having been cleaned and wrapped in gas permeable bags are placed in the chamber. Air is then evacuated from the chamber by pulling a vacuum and perhaps by displacing the air with steam. In certain embodiments, it is preferable to inject steam into the chamber to achieve a relative humidity that ranges preferably from about 30% to about 70%. Such humidities may maximize the sterilizing effectiveness of the sterilant, which is introduced into the chamber after the desired relative humidity is achieved. After a period of time sufficient for the sterilant to permeate the wrapping and reach the interstices of the article, the sterilant and steam are evacuated from the chamber.

In the preferred second step of the process (the aeration step), the articles are aerated to remove sterilant residues. Removing such residues is particularly important in the case of toxic sterilants, although it is optional in those cases in which the substantially non-toxic compounds of the present invention are used. Typical aeration processes include air washes, continuous aeration, and a combination of the two. An air wash is a batch process and usually comprises evacuating the chamber for a relatively short period, for example, 12 minutes, and then introducing air at atmospheric pressure or higher into the chamber. This cycle is repeated any number of times until the desired removal of sterilant is achieved. Continuous aeration typically involves introducing air through an inlet at one side of the chamber and then drawing it out through an outlet on the other side of the chamber by applying a slight vacuum to the outlet. Frequently, the two approaches are combined. For example, a common approach involves performing air washes and then an aeration cycle.

G. Stabilization Methods

The present invention further provides methods for stabilizing a composition comprising iodocarbons, such as trifluoroiodomethane. The preferred method steps comprise providing at least one iodocarbon compound and stabilizing said at least one iodocarbon compound by exposing the compound to a diene-based compound(s) of the present invention. In many embodiments, the iodocarbon providing step comprises providing a composition, including the specific types of compositions described above, and adding to such composition and a diene-based compound of the present invention, preferably by mixing an effective amount of a stabilizer composition of the present invention with said iodocarbon composition.

H. Supercritical Methods

It is contemplated that in general many of the uses and methods described herein can be carried out with the present compositions in the supercritical or near supercritical state. For example, the present compositions may be utilized in solvent and solvent extraction applications mentioned herein, particularly for use in connection with materials such as alkaloids (which are commonly derived from plant sources), for example caffeine, codeine and papaverine, for organometallic materials such as metallocenes, which are generally useful as catalysts, and for fragrances and flavors such as Jasmone.

The present compositions, preferably in their supercritical or near supercritical state, can be used in connection with methods involving the deposit of catalysts, particularly organometallic catalysts, on solid supports. In one preferred embodiment, these methods include the step of generating finely divided catalyst particles, preferably by precipitating such catalyst particles from the present compositions in the supercritical or near supercritical state. It is expected that in certain preferred embodiments catalysts prepared in accordance with the present methods will exhibit excellent activity.

It is also contemplated that certain of the MDI methods and devices described herein may utilize medicaments in finely divided form, and in such situations it is contemplated that the present invention provides methods which include the step of incorporating such finely divided medicament particles, such as albuterol, into the present fluids, preferably by dissolving such particles, in the present composition, preferably in the supercritical or near supercritical state. In cases where the solubility of the materials is relatively low when the present fluids are in the supercritical or near supercritical state, it may be preferred to use entrainers such as alcohols.

It is also contemplated that the present compositions in the supercritical or near supercritical state may be used to clean circuit boards and other electronic materials and articles.

Certain materials may have very limited solubility in the present compositions, particularly when in the supercritical or near supercritical state. For such situations, the present compositions may be used as anti-solvents for the precipitation of such low solubility solutes from solution in another supercritical or near supercritical solvent, such as carbon dioxide. For example, supercritical carbon dioxide is utilized frequently used in the extrusion process of thermoplastic foams, and the present compositions may be used to precipitation certain materials contained therein.

It is contemplated also that in certain embodiments it may be desirable to utilize the present compositions when in the supercritical or near supercritical state as a blowing agent.

EXAMPLES

The application is further explained in light of the following examples, which are illustrative and not intended to be limiting in any manner.

Example I

Example I-1

This example illustrates a stabilized composition of the present invention comprising $CF_3I$, PAG oil, and isoprene.

A mixture (1.6 grams) of trifluoroiodomethane (25 wt. %) and HFO-1234yf (75 wt. %) is added to 3 grams of a composition containing 99% by weight of PAG oil and 1% by weight of isoprene. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the refrigerant has during the period remained miscible and soluble in the PAG oil. In addition, the liquid in the tube is clear with a light yellow color. The steel coupon appears unchanged.

The glass tube is opened and the gas is extracted. The gas is examined by gas chromatography for the presence of trifluoromethane (HFC-23), which is a decomposition product of the oil reacting with the trifluoroiodide. The level of HFC-23 found is about 0.23±0.07 wt. %.

Example I-2

This example illustrates a stabilized composition of the present invention comprising $CF_3I$, PAG oil, and myrcene.

A mixture (1.6 grams) of trifluoroiodomethane (25 wt. %) and HFO-1234yf (75 wt. %) is added to 3 grams of a composition containing 99% by weight of PAG oil and 1% by weight of myrcene. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the refrigerant has during the period remained miscible and soluble in the PAG oil. In addition, the liquid in the tube is clear with a light yellow color. The steel coupon appears unchanged.

The glass tube is opened and the gas is extracted. The gas is examined by gas chromatography for the presence of trifluoromethane (HFC-23), which is a decomposition product of the oil reacting with the trifluoroiodide. The level of HFC-23 found is 0.27 wt. %. The experiment is repeated and the result is 0.28 wt % of HFC-23.

Example I-3

This example illustrates a stabilized composition of the present invention comprising $CF_3I$, PAG oil, and farnesol.

A mixture (1.6 grams) of trifluoroiodomethane (25 wt. %) and HFO-1234yf (75 wt. %) is added to 3 grams of a composition containing 99% by weight of PAG oil and 1% by weight of farnesol. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the refrigerant has during the period remained miscible and soluble in the PAG oil. In addition, the liquid in the tube is clear with a light yellow color. The steel coupon appears unchanged.

The glass tube is opened and the gas is extracted. The gas is examined by gas chromatography for the presence of trifluoromethane (HFC-23), which is a decomposition product of the oil reacting with the trifluoroiodide. The level of HFC-23 found is 0.16 wt. %.

Example I-4

This example illustrates a stabilized composition of the present invention comprising $CF_3I$, PAG oil, and geraniol.

A mixture (1.6 grams) of trifluoroiodomethane (25 wt. %) and HFO-1234yf (75 wt. %) is added to 3 grams of a composition containing 99% by weight of PAG oil and 1% by weight of geraniol. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the refrigerant has during the period remained miscible and soluble in the PAG oil. In addition, the liquid in the tube is clear with a light yellow color. The steel coupon appears unchanged.

The glass tube is opened and the gas is extracted. The gas is examined by gas chromatography for the presence of trifluoromethane (HFC-23), which is a decomposition product of the oil reacting with the trifluoroiodide. The level of HFC-23 found is 0.14 wt. %.

Example I-5

This example illustrates a stabilized composition of the present invention comprising $CF_3I$, polyalkylene glycol lubricant, and myrcene with a triphenylphosphite (DP213- available from Dover Chemical) as additives in the oil. Each additive was present at 0.5 wt. % in the oil.

A mixture of trifluoroiodomethane (about 9 wt. %) and HFO-1234yf (about 91 wt. %) (1.6 grams) was added to 3 grams of a composition containing 99% by weight of a polyalkylene glycol lubricant (commercially available as Motorcraft PAG Refrigerant Compressor Oil) and 1 wt. % of additive as described in the paragraph above. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the iodocarbon compound during this period remains miscible and soluble in the PAG oil. In addition, the liquid in the tube is clear with a light yellow color. The steel coupon appears unchanged.

The glass tube is opened and the gas is extracted. The gas is examined by gas chromatography for the presence of HFC-23, which is a decomposition product of the oil reacting with the trifluoroiodide. The level of HFC-23 found is about 0.2 wt. %.

Example I-6

This example illustrates a stabilized composition of the present invention comprising $CF_3I$ and polyalkylene glycol lubricant, and a stabilizer consisting of myrcene.

Trifluoroiodomethane (1.6 grams) is added to 3 grams of the polyalkylene glycol lubricant containing myrcene, with the myrcene being present on the basis of 1 wt. % based on the total weight of the lubricant. The resulting mixture is placed into a glass tube with metal coupons of aluminum, steel, and copper and the tube is sealed. The sealed glass tube is put into an oven at 300° F. for two weeks. After such time the tube is removed and observed.

Upon observation, the mixture is one phase, indicating that the refrigerant is miscible and soluble in the PAG oil. In addition, the liquid in the tube is clear with a light yellow color. The steel coupon appears unchanged.

The glass tube is opened and the gas is extracted. The gas is examined by gas chromatography for the presence of trifluoromethane (HFC-23), which is decomposition product of the oil reacting with the trifluoroiodide. The level of HFC-23 found is 0.23 wt. %.

Example I-7

This example illustrates that the level of decomposition of $CF_3I$ in mineral oil, is dramatically decreased by the combination of additives myrcene and Doverphos DP 213.

A mixture (1.6 grams) of trifluoroiodomethane (25 wt. %) and HFO-1234yf (75 wt. %) is added to 3 grams of mineral oil. The mineral oil contained 0.5 wt. % of myrcene and 0.5 wt. % Doverphos DP-213. The resulting mixture is placed into a glass tube with metal coupons of aluminum, steel, and copper, and the tube is then sealed. The sealed glass tube is put into an oven at 300° F. for two weeks. After such time the tube is removed.

The glass tube was opened and the gas was extracted. The gas was examined by gas chromatography for the presence of trifluoromethane (HFC-23), which is a decomposition product of the oil reacting with the trifluoroiodide. The level of HFC-23 found is 0.08 wt. %. The experiment is repeated and the result is 0.08 wt % of HFC-23.

Comparative Example I-1

A mixture of trifluoroiodomethane (about 9 wt. %) and HFO-1234yf (about 91 wt. %) (1.6 grams) was added to 3 grams of a composition containing 99% by weight of a polyalkylene glycol lubricant (commercially available as Motorcraft PAG Refrigerant Compressor Oil). No stabilizer additive is used. The resulting mixture is placed into a glass tube with metal coupons of aluminum, steel, and copper, and the tube is then sealed. The sealed glass tube is put into an oven at 300° F. for two weeks. After such time the tube is removed and observed.

Upon observation, the mixture is one phase, indicating that the refrigerant composition during this period remains miscible and soluble in the mineral oil. After the exposure, the metal coupons are discolored and the color of the lubricant is dark brown.

The glass tube is opened and the gas is extracted. The gas is examined by gas chromatography for the presence of HFC-23 that is decomposition product of the oil reacting with the trifluoroiodide. The level of HFC-23 found is about 1.0 wt. %.

Comparative Example I-2

A mixture (1.6 grams) of trifluoroiodomethane (25 wt. %) and HFO-1234yf (75 wt. %) is added to 3 grams of mineral oil. The resulting mixture is placed into a glass tube with metal coupons of aluminum, steel, and copper, and the tube is then sealed. The sealed glass tube is put into an oven at 300° F. for two weeks.

The glass tube was opened after the two week exposure and the gas was extracted. The gas was examined by gas chromatography for the presence of trifluoromethane (HFC-23), which is a decomposition product of the oil reacting with the trifluoroiodide. The level of HFC-23 found is 0.76 wt. %. The experiment is repeated and the result is 1.51 wt % of HFC-23.

Example II

This example illustrates stabilized compositions of the present invention comprising a 30/70 blend of $CF_3I$/HFO-1234yf, PAG oil (RL-897), and a stabilization compound. Four grams of RL-897 and 1.62 grams of $CF_3I$/HFO-1234yf blend were put into a sealed glass tube along with a metal assembly made of aluminum, steel and copper. The sealed tube was put into an oven at 300° C. for 2 weeks. The tubes were removed from the oven, cooled, opened, and the gas is extracted.

Under these conditions, the breakdown products of $CF_3I$ will be R-23 in the gas phase. Accordingly, the gas was analyzed for the amount of R23 in it. A baseline test with no additives was also tested.

Since the concern is the breakdown of $CF_3I$, additives at 1% in the oil were tested for their effect on the level of the breakdown products. The results are presented in Table I below.

TABLE I $CF_3I$ Breakdown in 30/70 Blend of $CF_3I$/HFO-1234yf.

| Example Stabilizer | R23% |
|---|---|
| Myrcene | 0.12% |
| Geraniol | 0.14% |
| Farnesol | 0.16% |
| Limonene | 0.36% |
| Diphenyl Phosphite (Doverphos 213; DOV213) | 0.61% |
| 1,2-epoxyhexene (HEXENE) | 0.77% |
| Dilauryl hydrogen phosphite (Doverphos 274; DP274) | 0.97% |
| 2,4-dimethyl-6-tert-butylphenol (AO1) | 1.62% |

TABLE I-continued

CF$_3$I Breakdown in 30/70 Blend of CF$_3$I/HFO-1234yf.

| | R23% |
|---|---|
| Allyl glycidyl ether (AGE) | 1.98% |
| Tocopherol (TOC) | 2.19% |
| Hexane gylcidyl ether (HDGE) | 2.38% |
| Comparative Stabilizer | |
| Phophorous acid (1-methylethylidene)di-4,1-phenylene-tetra-C$_{12-15}$ alkylesters | 2.60% |
| 2-ethyl hexyl glycidyl ether (2EHGE) | 2.62% |
| Tridecyl gylcidylether (13R) | 2.74% |
| Phosphorous acid, 2-ethylhexyl diphenyl ester (DOV9EH) | 3.63% |
| Trans2,3-epoxybutane | 4.04% |
| Dodecyl gylcidyl ether (HAG12) | 4.73% |
| cis-2,3-epoxybutane | 5.25% |
| No additive | 2.5%, 3.8% |

Results for the stabilizers phosphate, 2,4-dimethyl-6-tert-butylphenol, allyl glycidyl ether, tocopherol, and hexane glycidyl ether indicate that breakdown of CF$_3$I to R23 is reduced in the 30/70 blend of CF$_3$I/HFO-1234yf. Results for the stabilizers myrcene, geraniol, farnesol, limonene, diphenyl phosphate, 1,2-epoxyhexene, dilauryl hydrogen indicated that breakdown of CF$_3$I to R23 is substantially reduced.

Example III

This example illustrates stabilized compositions of the present invention comprising a 30/70 blend of CF$_3$I/HFC-32, PAG oil (ND-8), and a stabilization compound. Two grams of ND-8 and two grams of CF$_3$I/HFC-32 blend were put into a sealed glass tube along with a metal assembly made of aluminum, steel and copper. The sealed tube was put into an oven at 300° C. for 1 week. The tubes were removed from the oven, cooled, opened, and the gas is extracted.

Under these conditions, the breakdown products of CF$_3$I will be R-23 in the gas phase and iodide ions in the oil. The oil was therefore analyzed for the amount of iodide in it. The gas was analyzed for the amount of R23 in it.

In addition to the 30/70 blend, tests were done on a 10/90 blend of CF$_3$I/HFC-32. A baseline test with no additives was done for each blend. Since the concern is the breakdown of CF$_3$I, additives at 1% in the oil were tested for their effect on the level of the breakdown products. The results are presented in Table II and III below.

TABLE II

CF$_3$I Breakdown in 30/70 Blend of CF$_3$I/HFC-32.

| | R23% | Iodide(ppm) |
|---|---|---|
| Comparative Stabilizer | | |
| No Additives | 0.73% | 195.5 |
| 1,2-butylene oxide | 0.97% | 479 |
| Dodecyl glycidyl ether | 1.03% | 188 |
| Glycidyl 2-methylphenyl ether | 0.82% | 139 |
| Example Stabilizer | | |
| Farnesol | 0.16% | 1 |
| Myrcene | 0.09% | 9 |
| Butadiene | 0.33% | 35 |
| Napthyl glycidyl ether | 0.43% | 35 |

TABLE III

CF$_3$I Breakdown in 10/90 Blend of CF$_3$I/HFC-32.

| | R23% | Iodide (ppm) |
|---|---|---|
| No Additives | 0.29% | 28 |
| Farnesol | 0.04% | 7 |

The baseline for 30/70 blend produces 0.73% R23 and an iodide concentration of 195 ppm. For the three comparative additives, the amount of R23 produced is greater, indicating that certain additives may be harmful. The corresponding iodide concentrations are either greater or not much reduced.

Results for the stabilizers farnesol, myrcene, butadiene and napthyl glycidyl ether indicate that breakdown of CF$_3$I to R23 is substantially reduced in the 30/70 blend of CF$_3$I/HFC-32. Similarly the iodide concentrations are much lower than with no additives or with one of the comparatives.

Results for farnesol as used in the 10/90 CF$_3$I/HFC-32 blend demonstrates a reduction in both the R$^{23}$ and iodide concentrations.

What is claimed is:

1. A heat transfer composition comprising:
   (a) at least one iodocarbon;
   (b) at least one refrigerant compound other than said iodocarbon;
   (c) a first stabilizing compound selected from the group consisting of dienes having at least four carbon atoms;
   (d) a second stabilizing compound selected from the group consisting of:
   (1) diene-based compounds having at least two carbon-carbon double bonds and at least four carbon atoms, different from (c);
   (2) epoxy compounds selected from compounds according to Formulas (E1) and (E2):

where
R$^1$ is an aliphatic radical having at least 3 carbon atoms;
R$^2$ is an aliphatic radical having 4 or 5 carbon atoms or a polycyclic aromatic radical;
(3) phosphites according to formula P1 below:

where each R is independently a phenyl radical or
a carboxylate radical having at least 6 but less than 15 carbon atoms;
(4) unhindered or mildly hindered phenols; and
(5) combinations of any two or more of these, said stabilizer compound(s) being present in an amount effective to stabilize said at least one iodocarbon against degradation; and (e) 30 wt % to about 50 wt % of at least one lubricant.

2. The heat transfer composition of claim 1 wherein $R^1$ comprises at least 4 carbon atoms.

3. The heat transfer composition of claim 1 wherein $R^1$ is an unsaturated aliphatic radical having from 4 to 6 carbon atoms.

4. The heat transfer composition of claim 1 wherein $R^1$ is a 4 carbon unsaturated aliphatic radical.

5. The heat transfer composition of claim 1 wherein $R^2$ is a naphthyl radical.

6. The composition of claim 1 wherein said at least one iodocarbon comprises $CF_3I$.

7. The composition of claim 1 wherein said second stabilizing compound is selected from the group consisting of (1) diene-based compounds having at least two carbon-carbon double bonds and at least four carbon atoms, different from (c); (2) epoxy compounds selected from compounds according to Formulas (E1) and (E2):

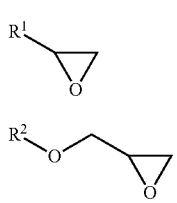

where
$R^1$ is an aliphatic radical having at least 3 carbon atoms;
$R^2$ is an aliphatic radical having 4 or 5 carbon atoms or a polycyclic aromatic radical;
(3) phosphites according to formula P1 below:

$$\underset{H}{RO-\overset{O}{\underset{\|}{P}}-OR} \quad (P1)$$

where each R is independently a phenyl radical or
a carboxylate radical having at least 6 but less than 15 carbon atoms, and combinations of any two or more of (1) through (3).

8. The composition of claim 1 wherein at least one stabilizing compound is selected from the group consisting of Myrcene, Geraniol, Farnesol, Farnesene, Limonene, Diphenyl Phosphite, 1,2-epoxyhexene, Dilauryl hydrogen phosphite, and combinations of two or more of these.

9. The composition of claim 1 wherein at least one stabilizing compound is selected from the group consisting of Myrcene, Geraniol, Farnesol, Farnesene, Limonene, Diphenyl Phosphite, 1,2-epoxyhexene, Dilauryl hydrogen phosphite, 2,4-dimethyl-6-tert-butylphenol, Tocopherol and combinations of two or more of these.

10. A heat transfer composition comprising:
(a) at least one iodocarbon;
(b) at least one refrigerant compound other than said iodocarbon;
(c) 30 wt % to about 50 wt % of at least one lubricant comprising polyalkyleneglycol (PAG);
(d) a first stabilizing compound selected from the group consisting of dienes; and
(e) a second stabilizing compound selected from the group consisting of diene-based compounds different from (d), epoxides, phosphates, phosphites, and combinations of two or more thereof.

11. The composition of claim 10 wherein said stabilizing compounds are present in the composition in an amount effective to stabilize said at least one iodocarbon against degradation under the conditions of use for said heat transfer composition.

12. The composition of claim 10 wherein said first stabilizing compound comprises butadiene.

13. The composition of claim 10 wherein said first stabilizing compound comprises at least one terpene-based compound.

14. The composition of claim 13 wherein said terpene-based compound is selected from the group consisting of myrcene, geraniol, farnesol, farnesene, limonene, and combinations of two or more thereof.

15. The composition of claim 10 wherein said stabilizing compound comprises an epoxide.

16. The composition of claim 15 wherein said epoxide is selected from the group consisting of 1,2-epoxyhexane, naphthyl glycidyl ether, and combinations of these.

17. The composition of claim 10 where said stabilizing compound comprises a phosphate or phosphite.

18. A heat transfer composition comprising:
(a) at least one iodocarbon;
(b) at least one refrigerant compound other than said iodocarbon;
(c) about 50 wt % to about 71 wt % of at least one lubricant comprising polyalkyleneglycol (PAG);
(d) a first stabilizing compound selected from the group consisting of dienes; and
(e) a second stabilizing compound selected from the group consisting of diene-based compounds different from (d), epoxides, phosphates, phosphites, and combinations of two or more thereof.

* * * * *